（12） United States Patent
Smits et al.

(10) Patent No.: US 10,034,486 B2
(45) Date of Patent: Jul. 31, 2018

(54) LIQUID ESPRESSO CONCENTRATE AND METHOD FOR PREPARING SAME

(71) Applicant: Koninklijke Douwe Egberts B.V., Utrecht (NL)

(72) Inventors: Joannes Hubertus Petrus Maria Smits, Utrecht (NL); Cornelis Hendricus de Vos, Utrecht (NL); Ghanshijam Bhansing, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

(21) Appl. No.: 15/639,688

(22) Filed: Jun. 30, 2017

(65) Prior Publication Data

US 2017/0295814 A1    Oct. 19, 2017

Related U.S. Application Data

(63) Continuation of application No. PCT/NL2015/050912, filed on Dec. 28, 2015.

(30) Foreign Application Priority Data

Jan. 2, 2015    (EP) .................................. 15150052

(51) Int. Cl.
*A23F 5/24* (2006.01)
*A23F 5/26* (2006.01)
*A23F 5/28* (2006.01)

(52) U.S. Cl.
CPC ................ *A23F 5/243* (2013.01); *A23F 5/26* (2013.01); *A23F 5/285* (2013.01)

(58) Field of Classification Search
CPC ............. A23F 5/243; A23F 5/26; A23F 5/285
See application file for complete search history.

(56) References Cited

U.S. PATENT DOCUMENTS

| | | | | |
|---|---|---|---|---|
| 2,420,615 | A | * | 5/1947 | Palmer .................... A23F 5/243 426/434 |
| 3,810,766 | A | * | 5/1974 | Holzberg ................ A23F 5/262 422/281 |
| 3,821,434 | A | * | 6/1974 | Houghton-Larsen et al. ........... A23F 5/243 426/106 |
| 4,277,509 | A | | 7/1981 | Wouda |

(Continued)

FOREIGN PATENT DOCUMENTS

| | | |
|---|---|---|
| EP | 0 097 466 | 1/1984 |
| WO | WO-2007/043873 A1 | 4/2007 |
| WO | WO-2014/003570 | 1/2014 |

OTHER PUBLICATIONS

International Search Report and Written Opinion for International Application No. PCT/NL2015/050912, dated May 25, 2016, 11 pages.

*Primary Examiner* — Anthony Weier
(74) *Attorney, Agent, or Firm* — Foley & Lardner LLP

(57) ABSTRACT

Shown is a method of making a coffee concentrate, and a coffee concentrate obtainable by the method. The method involves primary and secondary extraction, with split tapping of the primary extract into a first and second primary draw off. The extraction is conducted under such conditions as to satisfy a minimum mass transfer Fourier number, and a minimum ratio of the extraction yield of the first primary draw-off to the extraction yield obtained in all extraction sections.

28 Claims, 3 Drawing Sheets

(56) References Cited

U.S. PATENT DOCUMENTS

| | | | | |
|---|---|---|---|---|
| 5,225,223 | A * | 7/1993 | Vitzthum | A23F 5/18 426/386 |
| 7,767,246 | B2 * | 8/2010 | Smits | A23F 5/26 426/388 |
| 2006/0083845 | A1 * | 4/2006 | Smits | A23F 5/26 426/594 |
| 2014/0147562 | A1 * | 5/2014 | Heijman | A23F 5/285 426/271 |
| 2016/0029655 | A1 * | 2/2016 | Heijman | A23F 5/24 426/594 |

* cited by examiner

LIQUID ESPRESSO CONCENTRATE AND METHOD FOR PREPARING SAME

CROSS-REFERENCE TO RELATED APPLICATIONS

This application is a continuation of PCT/NL2015/050912, filed Dec. 28, 2015, which claims the benefit of and priority to European Patent Application No. EP15150052.7 filed on Jan. 2, 2015, the entire contents of all of which are incorporated herein by reference.

FIELD

The invention is in the field of coffee concentrates. Particularly, the invention relates to a method for preparing a concentrated coffee extract (hereinafter: coffee concentrate), and to the extract or concentrate obtainable therewith. More specifically, the invention relates to a coffee concentrate with improved sensorial characteristics which matches more closely to an espresso based coffee brew of a bean to cup espresso machine for preparation of e.g., ristretto, espresso or lungo and/or milk based drinks, e.g., cappuccino or latte macchiato.

BACKGROUND

Coffee concentrates are increasingly in demand for commercial and/or industrial purposes. A typical area of use of such liquid coffee concentrates, is in coffee dispensing machines. Many of such machines do not operate by freshly preparing a coffee extract, but by adding hot water to a form of an industrially manufactured coffee extract. Thus, such machines dispense coffee either by reconstitution from soluble coffee particles, or by dilution of coffee concentrates.

The term "coffee concentrate" has a given meaning in the art, as referring to aqueous concentrates, having a dry solid matter content of from 15% to 55% by weight (which dry solid matter is present in the concentrate largely as liquid-soluble solids). These concentrates are sometimes also denoted as "liquid coffee concentrates." This refers to the state, generally at ambient temperature, in which the concentrates are used in practice (as flowable, preferably pumpable liquids). In many events, the stable storage of such concentrates requires cooling, and more typically freezing. Therefore, coffee concentrates which are used in liquid form, are frequently also indicated to be frozen liquid coffee concentrates. Hereinafter, the terms "coffee concentrate" and "liquid coffee concentrate" are used interchangeably, and these terms include coffee concentrates in a liquid form as well as in a frozen form.

A continuing challenge in providing coffee from machines, as mentioned above, that operate on the basis of coffee that is not freshly extracted, is to make coffee that bears a sufficient resemblance, particularly in respect of aroma, to freshly extracted coffee. This challenge is even more pronounced in the event of dispensing coffee of the espresso type. Espresso is a type of coffee drink that is traditionally brewed by forcing pressurized water of approximately 95° C. through a coffee bed of finely ground beans. Due to this specific type of processing a specific kind of coffee drink results, having a typical flavor that cannot be just attributed to using specific beans, blends of beans, and/or roasting level. To produce a coffee having a recognizable espresso flavor, such as taste and/or aroma, without freshly using the specific espresso brewing process, is notoriously difficult.

Typical developments in making dispensing machines for espresso-type coffee drinks, are devoted to machines operating by freshly making an espresso brew, e.g., from roast and ground coffee for use in such machines. However, it would be desired to also provide espresso that can be just obtained from a dispensing machine that does not itself apply an extraction process, but which just operates on the basis of diluting a pre-existing, e.g., industrially prepared, liquid coffee concentrate.

A liquid coffee concentrate suitable to make an espresso type of coffee is not available in the art.

A background reference on making liquid coffee concentrates is WO 2007/043873, which describes a process wherein roast and ground coffee is subjected to a dual extraction, whereby a secondary extraction is carried out at a higher temperature than the primary extraction. The method as disclosed, e.g., involving aroma recovery and high water to coffee ratios, is suitable for preparing liquid concentrates having an improved coffee flavor/aroma. The method as disclosed, however, does not result in an espresso-type of coffee concentrate.

It is desired to make a liquid coffee concentrate that is suitable for providing an espresso-type of coffee brew. It is further desired to provide such a liquid coffee concentrate in an economically viable process. A particular desire is to provide a liquid coffee concentrate with improved sensorial characteristics.

SUMMARY

In order to better address one or more of the foregoing desires, the invention presents, in one aspect, a method for preparing a coffee concentrate comprising the steps of:
 (a) providing ground roasted coffee beans having an average Martin diameter minimal value of from 0.5 to 3 mm;
 (b) subjecting the ground roasted coffee beans to primary extraction with water, so as to obtain a first primary extract with a draw-off factor of at most 2;
 (c) drawing off a second primary extract after said first primary extract;
 (d) subjecting the primarily extracted ground roasted coffee beans to a secondary extraction with water, so as to obtain a secondary extract;
 (e) subjecting the second primary extract and the secondary extract to evaporation so as to obtain a concentrated extract having a dry solid matter content of from 30 wt. % to 75 wt. %;
 (f) combining the concentrated extract with the first primary extract;
 (g) optionally adding water;
 so as to obtain a liquid coffee concentrate having a dry solid matter content of from 15 wt. % to 55 wt. %, wherein the primary extraction is conducted under such conditions as to satisfy a mass transfer Fourier number of at least 0.35; and wherein the ratio of the extraction yield of the first primary draw-off to the extraction yield obtained in all extraction sections is in a range of from 0.15 to 1.0.

In another aspect, the invention provides a coffee concentrate comprising 15% to 55% dry solid matter, obtainable by the foregoing process of the invention.

In yet another aspect, the invention pertains to a coffee concentrate comprising 15% to 55% dry solid matter, characterized by comprising 1-caffeoylquinic acid lactone (1-CQL) in an amount of at least 450 mg chlorogenic acid equivalents per kg of dry solid matter.

DETAILED DESCRIPTION

Figure 1:
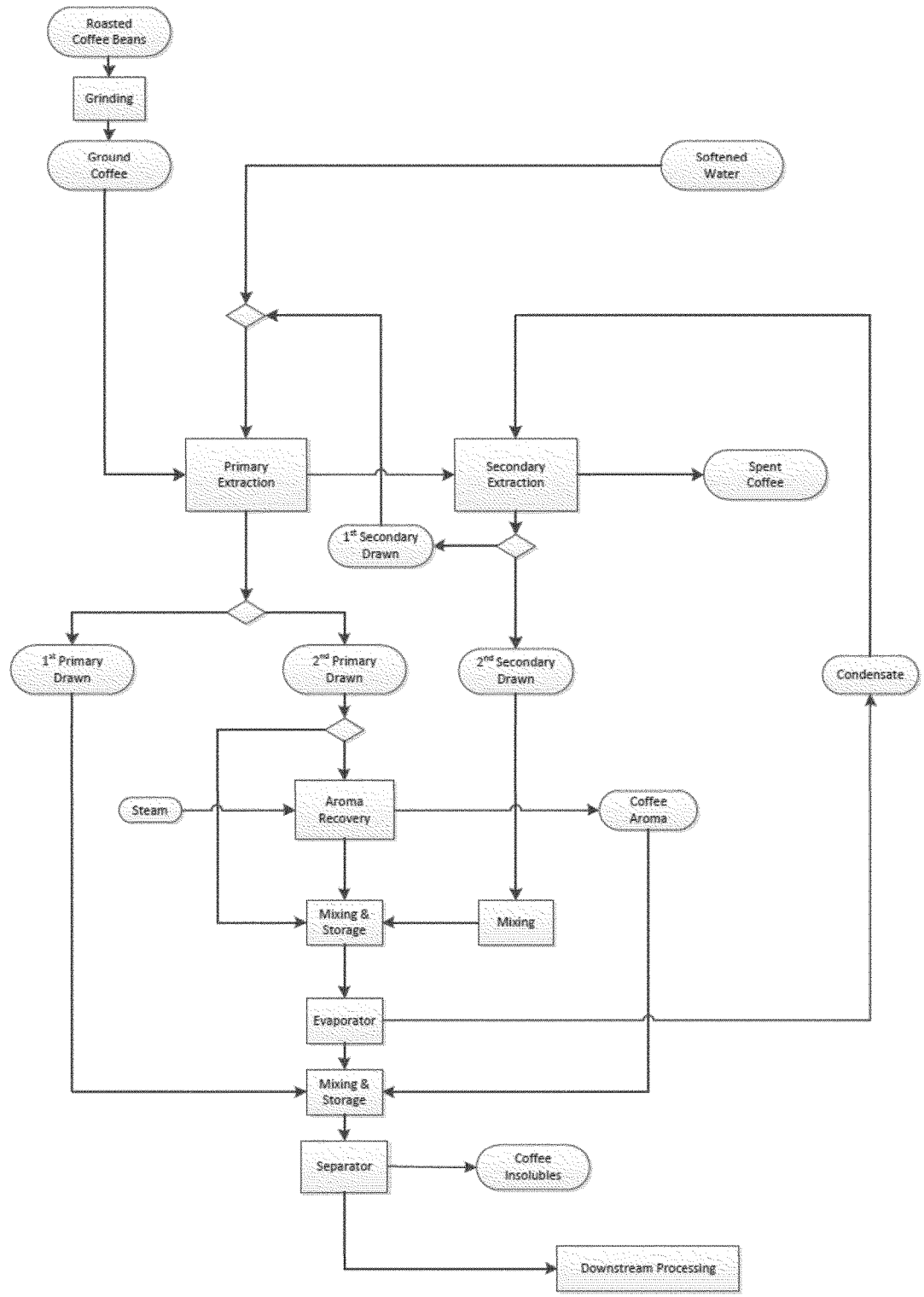
FIG. 1 is a flow scheme for an embodiment of the process of the invention.

In a broad sense, the invention is based on the judicious insight that a liquid espresso concentrate can be made by a process involving a primary and a secondary extraction, whereby the primary extraction is conducted in a way so as to improve flavor/aroma extraction, and whereby the total extraction is conducted in a consciously reduced total extraction yield. The latter is reflected in the ratio of first primary draw-off extraction yield and total extraction yield. The former is reflected in the Fourier mass transfer number, which is further detailed later in this description.

In the process of the invention, initially ground roasted coffee beans are provided. The main coffee species used are washed and unwashed Arabica beans and Robusta beans. Typically, mixtures of both can be used. These beans can be recognized as having a specified geographical origin, such as Colombia, Brazil or Indonesia.

For improving the espresso character of the liquid coffee concentrate, in optional embodiments of the invention, two main preferences are taken into account in respect of the roast and ground coffee used. One is the degree of roasting and the time of roasting, the other is the size of the coffee grounds.

The degree of roasting can be determined in various ways. One method is to determine the color of the roast coffee beans. A method known to the skilled person is based on Dr. Lange colorimeters. Preferably, thereby the degree of roast is such as to satisfy a value for a Dr. Lange color measurement of 32 to 54. As known to the skilled person, a higher value indicates a lighter degree of roast. Hereby a value at the low end of the range is be suitable for a strong espresso appearance, whilst a value at the high end of the range is more commensurate with an espresso of the type known as "lungo" (which, if freshly brewed, is made with a higher amount of water than a traditional espresso).

In the event that a Dr. Lange colorimeter should not be commercially available, an alternative method to determine the color of the roast coffee beans is by using a Colorette colorimeter (from Probat-Werke von Gimborn Maschinenfabrik GmbH, Emmerich, Germany). Using a Colorette type 3B, the value range according to the Dr. Lange colorimeter of 32 to 54 corresponds to a value range of 54 to 100. Thereby the color value according to the Colorette colorimeter equals $(73.1918+4.95864*DrL)/(1+0.0188118*DrL-0.0000215185*DrL*DrL)$, whereby DrL is the color value according to the Dr. Lange colorimeter.

The degree of roasting can also be determined with reference to the weight loss as a result of roasting (whereby roasting at higher temperatures and/or longer roasting times will result in a higher weight loss). Typically preferred values for roasting degrees in accordance with the invention are of from 13.0 wt. % to 18.5 wt. % for Arabica coffees, and of from 16.0 wt. % to 20 wt. % for Robusta coffee.

The desired character of the liquid coffee concentrate of the invention is believed to benefit from applying coffee grounds of a relatively small grinding size on an industrial scale. The roast and ground coffee beans subjected to the extraction process of the invention, are of a size such as to satisfy a Martin diameter minimal value of from 0.5 to 3 mm.

The Martin diameter is the length of the area bisector of an irregular object in a specified measuring direction. It is determined by a CAMSIZER® P4 measuring system, which is based on the Dynamic Image Analysis principle. Hereby the bulk material (the particle sizes of which are to be determined) falls between light source and cameras. Each particle is detected by the cameras and is then digitalized and processed by a connected computer.

The Martin diameter $X_{Ma}$ is determined in 32 directions. The Martin diameter of 1 particle is the minimal value of the series of measured $X_{Ma}$ over all directions. In the present disclosure reference is made to the average of the minimum Martin diameter value, which is of from 0.5 to 3 mm. It will be understood that not all particles have the same size. In such an event, it is customary to refer to a calculated average particle size derived from the distribution of measured Martin diameters (minimum value). In this disclosure, the average particle size thereby used is the aforementioned is the calculated average value of the distribution of a series of measured Martin diameter (minimal value). In other words, different particles have different Martin diameters (minimal value), and thus the average of these minimal values is a useful parameter.

A preferred range is from at least 0.8 mm, such as at least 1.0 mm, such as at least 1.2 mm, to below 2 mm, such as below 1.9 mm, such as below 1.8 mm. In an interesting embodiment, the size range is 1.1 to 1.9 mm, preferably 1.6 to 1.8 mm.

The size of the grounds can be predetermined by means of the settings of the grinder, particularly with reference to the distance between 2 rollers. A single or multiple stage grinder can be used. The ground size is controlled by means of Camsizer-type particle size measurement device as mentioned above.

As customary in the art, the roast and ground coffee beans are extracted with water. Hereinbefore and hereinafter the term "water" applies to any aqueous liquid customarily used in making coffee extracts. This can be, e.g., regular tap water, sodium softened water, cation and anion demineralized water or aqueous condensates from evaporators (during de-watering of coffee extracts) or mixtures thereof.

A first extraction step of the method of the invention, comprises subjecting the ground roasted coffee beans to a primary extraction. This extraction can be carried out in an extraction section comprising one or more conventional extraction cells or percolators.

As the skilled person knows, the term "primary extraction" in the art of coffee extraction has a specific meaning of physical extraction. Thus during a primary extraction water soluble coffee components are extracted. In this primary extraction, as an extraction fluid normally water is used of a temperature below 120° C., typically between 70° C. and 120° C., preferably between 85° C. and 95° C. Advantageously, the coffee is extracted in a fixed bed cell or percolator in up-flow or down flow or according to the counter current extraction principle. Per cycle, as a rule, a primary water to coffee bean weight ratio is used between 2.8 and 15, preferably between 3 and 10, most preferably between approximately 4.0 and 8.0. In the method according to the invention, a cycle mostly takes up between 10 and 60 minutes. The cycle time is defined as the time between the moment of connecting a percolator with fresh into the primary extraction section and the moment until the primary extraction section is reloaded by a new percolator filled with fresh roast and ground coffee.

The primary extraction is done so as to obtain a first primary extract with a draw-off factor of at most 2, preferably at most 1.5. More preferably, the draw-off factor is at most 1, and even more preferably at most 0.7. In this description and in the claims, "draw-off factor" is understood to mean the ratio of the mass of the extract and the mass of the dry roasted and ground coffee in the primary extraction section. In practice, this draw-off factor is determined by a compromise between, on the one side, a sufficient degree of extraction of coffee solubles and aroma in the first primary extract, and, on the other side, a lowest possible volume of the first primary extract. The primary draw-off factor which can be applied for that matter depends upon: the applied coarseness or degree of grinding of the roasted coffee beans, the extraction cell and, in particular, the number of percolators connected in series, the applied water-to-coffee ratio, the applied cycle time, the applied feed water temperature and the desired concentration of the end product and the like. The water to coffee ratio in primary extraction is preferably in a range of from 4 to 15, preferably below 10, and more preferably of from 4 to 8.

In accordance with the invention, during the primary extraction, the extract is drawn off in two stages. In other words, the primary extract is split (fractionated) during tapping, so as to generate a first (highly aromatic) and a second primary draw off. It will thus be understood that the primary extraction, defined as above with reference to steps (b) and (c) comprises obtaining a first primary extract with a draw-off factor of at most 2, and drawing off a second primary extract after said first primary extract. As defined above, this primary extraction, i.e., the combined steps of obtaining the first and second primary extracts, is conducted under such conditions as to satisfy a mass transfer Fourier number of at least 0.35 (which is based on the applied: average coffee ground size (average minimum Martin diameter) and coffee residence time in the primary extraction section and applied extraction temperature which has impact on the intra particle diffusion coefficient) as further defined hereinafter.

The partial extracted ground roasted coffee beans from the primary extraction are further subjected to a secondary extraction. As is known to the skilled person, a secondary extraction includes among others a thermal hydrolysis of the partial extracted ground roasted coffee particles. Thereby components generated during a thermal hydrolysis which are soluble in water will be extracted from the coffee. Secondary extraction is not limited to components generated by thermal hydrolysis. Typically also a further amount pre-existing (primary, but not yet extracted) soluble components will become extracted in secondary extraction.

The secondary extract is prepared through a secondary extraction with water or an aqueous liquid in a secondary extraction section comprising one or more extraction cells in series. In this extraction section, the ground coffee beans are subjected to an extraction at a higher extraction temperature than in the event of primary extraction, as a rule at a feed water temperature between 120° C.-220° C. The first fraction of a secondary extract from the secondary extraction is optionally fed to the primary extraction cell as extraction liquid. The remaining extract, the second fraction of secondary extract, obtained from the secondary extraction, is combined with the second primary extract, optionally after the evaporation step.

The primary and secondary extractions can be carried out in customary extraction cells. In a preferred embodiment, both the primary and the secondary extraction are carried out in a percolator or in percolators placed in series. In particular the secondary extraction is advantageously carried out in at least 2, and preferably at least 4 series-connected percolators. As a rule, the number of percolators used in the primary extraction section is at least 0.5 which means that during 50% of the cycle time 1 percolator is connected in the primary extraction section. Preferably, at least 1 or 2 percolators are connected in the primary extraction section. Based on the coffee residence time derived from the size of the coffee grounds and the mass transfer Fourier number, the skilled person will be able to define a suitable number of percolators based on a chosen cycle time.

The first primary extract is of very high sensorial quality and is highly concentrated; preferably, it is directly cooled to maximally 25° C., but more preferably to maximally 10° C., such as 0° C., and most preferably to −2° C. Preferably, the primary extract is kept under an inert gas atmosphere, for instance a nitrogen atmosphere.

The invention further involves subjecting the second primary extract and the secondary extract to evaporation so as to obtain a concentrated extract. The evaporation can be conducted separately for both of the extracts, after which the concentrated extracts are combined. Preferably, the second primary extract and the secondary extract are combined first, and then evaporated.

The second draw of the primary extract is concentrated, usually together with the secondary extract, to a content of dry solid matter between 30 and 75%, more preferably between 35 and 65%, highly preferably between 40 and 60%.

Ultimately, the concentrated extract obtained from the second primary extract and the secondary extract is combined with the first primary extract, so as to obtain a liquid coffee concentrate. To the extent needed in order to arrive at the desired concentration of the coffee concentrate, water can be added so as to adjust the dry solid matter content, so as to obtain a coffee concentrate having a dry solid matter content of from 15 wt. % to 55 wt. %.

In various interesting embodiments of the process of the invention, the process variables are chosen as follows.

Roasting: degree of roast (Dr. Lange) of from 32 (darker) to 54 (lighter); roasting loss ranging from 13 (lighter) to 20 (darker); roasting time: ranging from 7.5 minutes to 15 minutes, preferably 8-10 minutes. For espresso (rather than lungo) types of coffee concentrates, a roast degree for arabica's of more than 15% roasting loss is preferred.

Coffee extraction: average coffee ground size (Martin diameter minimal value) ranging from 0.5 mm to 3.0 mm, preferably 1.4 mm to 1.9 mm. Total extraction yield for coffee solubles (Y_TE): ranging from 25% to 45%, preferably of from 30% to 35%. First primary drawn soluble solids yield (Y-PE1): ranging from 7.5% to 25% preferably of from 10% to 20%. Rate of Y_PE1 to Y_TE: ranging from 0.15 to 1.0, preferably of from 0.20 to 0.60, more preferably of from 0.30 to 0.40. Fourier number for primary extraction: preferably ranging from 0.35 to 3.0, more preferably of from 0.5 to 1.5, most preferably from 0.5-1.0.

Aroma recovery: optional partial aroma recovery from second primary extract by means of steam stripping: ranging from 0 to 60%; preferably (if done) 20% to 40%.

Dry matter content of concentrate after evaporation of coffee extracts: ranging from 30% to 75%, preferably 40% to 60%.

The final dry solid matter content of the coffee concentrates obtainable according to the invention ranges from 15 wt. % to 55% wt. %, preferably from 25 wt. % to 35 wt. %.

An embodiment of the process of the invention is depicted in a flow scheme in FIG. 1. It will be understood that the invention is not limited to the specific scheme shown.

In accordance with the invention, an additional measure is taken so as to obtain a liquid coffee concentrate having an espresso character. To this end, the primary extraction is conducted in such a way as to satisfy a mass transfer Fourier number of at least 0.35, preferably 0.35 to 3.0; and the ratio of the yield obtained in the first primary extract to the yield obtained in the total extraction of from 0.20 to 0.60 and preferable 0.3 to 0.4

The Fourier number $N_{F0}$ is represented by the following formula (I)

$$N_{Fo}=D \cdot t/(Rp)^2 \qquad (I)$$

wherein $N_{Fo}$ Fourier number for intra particle mass transfer;

t contact time for mass transfer (s); this is given by the residence time of the ground coffee in the primary extraction section;

Rp average particle radius (m); this is derived from the average Martin diameter minimal value, said value divided by 2; D intra-particle diffusion coefficient for solutes within a coffee matrix (m$^2$/s). The value for D is typically $2 \cdot 10^{-10}$ m$^2$/s for extraction at 95° C. The value will be lower or higher at, respectively, lower or higher extraction temperatures. These values are known to the skilled person and have been derived from a finite bath extraction experiments of a series of different coffee origins roasted at different conditions and extracted at different coffee ground sizes. By the use of a physical diffusion model based on a constant diffusion coefficient value, the diffusion coefficient can be derived for the finite bath extraction experiments.

| T [° C.] | D [m2/s] |
|---|---|
| 70 | 1.23E−10 |
| 80 | 1.45E−10 |
| 96 | 2.10E−10 |

The diffusion coefficient for other temperatures can be found by means of interpolation by the use of the Arrhenius equation (II) for the temperature dependency of the diffusion coefficient.

$$D = D_0 * e^{\left(-\frac{E_a/R}{T(K)}\right)} \qquad (II)$$

wherein for the Activation Energy $E_a$ of 36.3 kJ/mol can be used

T: absolute temperature (K)

R: ideal gas constant 8,315 J K-1 mol-1

As a result, the applied Fourier mass transfer number is a dimensionless measure for the degree of extraction of coffee solubles from the coffee matrix, The skilled person, once apprised of the range to be set for the Fourier mass transfer number, will be able without undue burden to adjust the process parameters accordingly. Particularly, the limits given for the $N_{FO}$ value directly guide the skilled person as to applying the corresponding restrictions on the combinations of applied coffee ground size (average Martin diameter minimum value), the coffee residence time in primary extraction section and the intra-particle diffusion coefficient depends on the applied extraction temperature. The skilled person will understand that, in a process of extracting coffee, adjustments to one process parameter may have an impact on another process parameter. Therefore, the present disclosure provides a technical measure based on setting a combination of process parameters, rather than individually setting these process parameters separately.

The guidance given hereinabove is further exemplified with reference to Tables 3, 4, and 5. These tables provide, for three sets of extraction conditions, the Fourier mass transfer number for a variety of combinations of the particle size (horizontal axis, i.e. the columns of the scheme, indicated as the average of the Martin diameter minimum value) and the residence time of the ground coffee in the primary extraction section (vertical axis, i.e, the rows of the table, indicated in minutes). For the calculation of the Fourier number the residence time is first converted to seconds, which is the applicable time unit in the above formula (I). The sets of conditions applicable to each of the Tables 3, 4, and 5 are outlined in Table 1 below.

TABLE 1

| Condition | Table 3 | Table 4 | Table 5 |
|---|---|---|---|
| Temperature (° C.) | 70 | 80 | 95 |
| Activation energy (kJ/mol) | 36.3 | 36.3 | 36.3 |
| Diffusion coefficient (m2/s) | 1.23E−10 | 1.45E−10 | 2.00E−10 |

As mentioned above, another technical measure according to the invention is to conduct the full extraction so as to reduce the total extraction yield. This is reflected in the ratio of the yield obtained in the first primary extraction to the yield obtained in the total extraction, which is set to be of from 0.15 to 1.0, preferably 0.20 to 0.60. This relatively high ratio goes against the regular practice in the art.

As the skilled person is well aware, the term "extraction yield" as used in the context of a process such as extraction, actually refers to the ratio of the amount of soluble coffee solids extracted from the roasted coffee divided by the amount of roasted coffee which is extracted, and that a skilled person is normally capable to set (which is different from a yield in, e.g., a chemical synthesis process, wherein the term generally refers to a result to be achieved).

The extraction yield is defined as the percentage of: mass of soluble coffee solids extracted per mass unit of dry roasted coffees. This is calculated according to the formula (III) below, with the following input:

cell load of R&G coffee ($m_c$)—corrected for moisture content ($\omega_w$)

mass of coffee extract drawn ($M_e$) from a coffee cell soluble solids content ($C_e$) of a coffee extract.

The soluble solids content is preferably measured by means of a refraction index. The soluble solids content can be derived from a calibration curve.

$$\eta = 100 \frac{M_e C_e}{m_c(1-\omega_w)} \quad \text{(III)}$$

The judicious combination of the settings for the Fourier mass transfer number and for the extraction yield ratio, serve to improve the quality of the primary extraction, and enhance the contribution of thereof to the total extract. Surprisingly, with coffee grounds of a size of less than 3 mm, particularly less than 2 mm, this results in a coffee concentrate having a more espresso-like character, even though a traditional espresso brewing has not occurred.

Accordingly, the invention also pertains to a coffee concentrate obtainable by the aforedescribed process, in any and all of its embodiments.

Moreover, the desirable aroma of the coffee concentrates according to the invention is surprisingly reflected in espresso aroma markers exhibited in the product obtainable with the method of the invention.

Without wishing to be bound by theory, the inventors believe to have identified a key flavor marker that reflects a unique character for the espresso-type coffee concentrate of the invention.

This is 1-caffeoylquinic acid lactone (1-CQL). A structure of 1-CQL is given in Formula (IV) below.

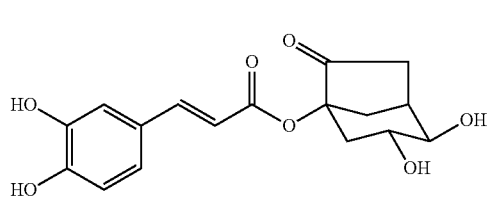

(IV)

Analytical Methods

Sample Preparation

A 115 gram coffee brew is prepared by weighing of a specified amount of chilled coffee concentrates of 6±1° C. in a small Schott flask which is diluted with hot water of 85±1° C. to a soluble solids content of exactly 1.6%. After hot water addition the Schott flask is closed immediately and is cooled down immediately in an ice-water bath. The cooled coffee brew is homogenised by gently shaking. The coffee brew is stored before analysis in a refrigerator at 8±1° C.

Identification of 1-Caffeoylquinic Acid Lactone (1-CQL)

Coffee caffeoyl quinic acid lactones are known as sensory active compounds associated with a mild and a pleasant bitter coffee taste. The coffee lactones were detected and identified by using high performance liquid chromatography (HPLC) coupled to both Photo Diode Array (PDA) detection and a high resolution quadrupole time-of-flight mass spectrometry (MS). All HPLC-PDA-MS components were from Waters Chromatography B. V. (Etten-Leur, The Netherlands). The retention time on the used column and solvent system conditions see matches with the presence of caffeoylquinic acid lactones, see De Vos et al., 2007, Nature Protocols 2, 778-791.

An observed high absorption on the Photo Diode-Array (PDA) detector at 324 nm would be consistent with an observation according to Frank et al., J. Agric. Food Chem. 2008, 56, 9581-9585. Based on a fragmentation pattern (see the formulae denoted (V) to (IX) below) acquired by a LTQ-Orbitrap FTMS (Thermo Instruments, Breda, The Netherlands) in Full scan mode and at 70,000 scan resolution (FWHM), details provided in by Van der Hooft et al., 2012. Metabolomics 8: 691-703, it could be confirmed to be a caffeoylquinic acid lactone by the quasimolecular ion $[M-H]^-$ at m/z 335.0774, and the characteristic fragments at m/z 135.045, 161.024 and 179.035. The occurrence of the fragment at m/z 173.0455 with an elemental composition of $C_7H_9O_5$ is well in line with the quinicacid lactone fragment of formula (IX) and is very likely when the caffeic acid moiety is connected to the 1-position of quinicacid lactone due to easy cleavage of this moiety from the of the 1-Caffeoyl Quinic Acid (1-CQA, accurate m/z $[M-H]^-$ of 335.0774).

(V)

Chemical Formula: $C_8H_7O_2^-$
Exact Mass: 135.05

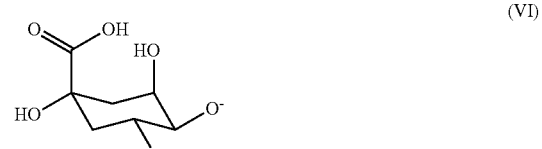

(VI)

Chemical Formula $C_7H_{11}O_6^-$
Exact Mass: 191.06

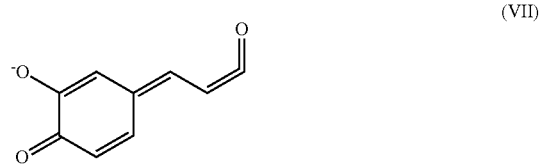

(VII)

Chemical Formula: $C_9H_5O_3^-$
Exact Mass: 161.02

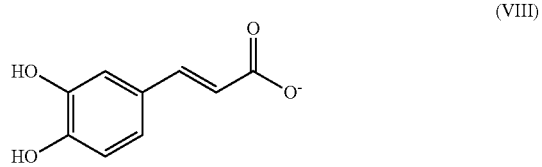

(VIII)

Chemical Formula: $C_9H_7O_4^-$
Exact Mass: 179.03

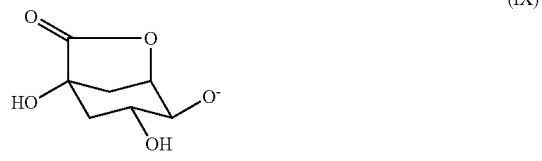

(IX)

Chemical Formula $C_7H_9O_5^-$
Exact Mass: 173.05

Distinct mass fragments of distinct (1-CQL) 1-caffeoyl quinic acid lactone present in liquid coffees. The relative high abundance of the m/z 173.0455 in the MS/MS spectra points to a 1-caffeoylquinic acid lactone. The easy cleavage of this lactone moiety is well in line with a 1-CQA. The MS/MS fragments observed are in accordance with Jaiswal et al. Food Research International 2014, 61, 214-227.

Quantification of 1-Caffeoylquinic Acid Lactone (1-CQL)

Figure 2:
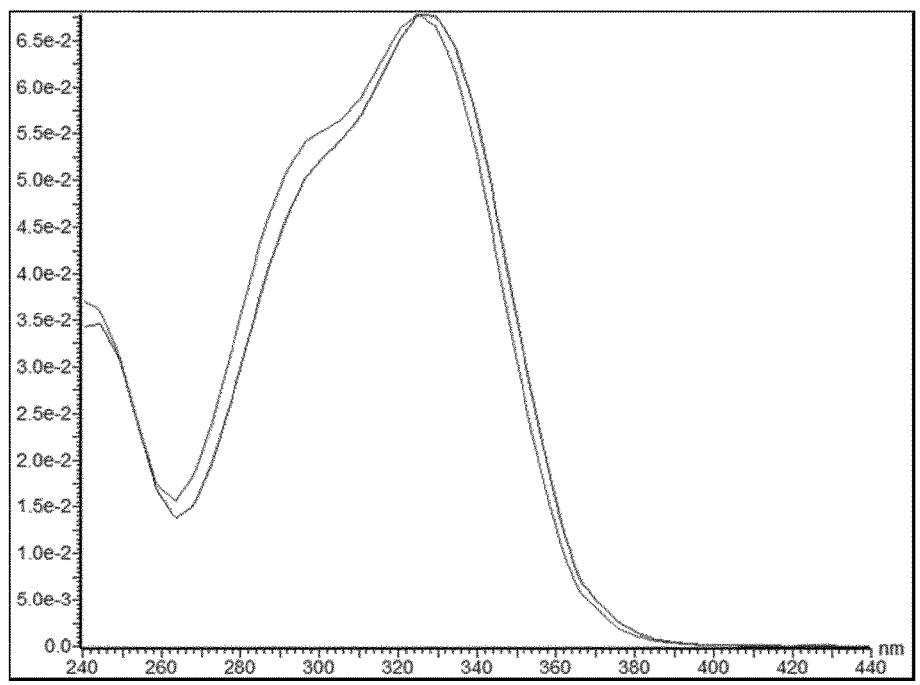
FIG. 2 shows the overlaid UV-Vis absorbance spectra of chlorogenic acid and 1-caffeoylquinic acid lactone (1-CQL).
Figure 3:
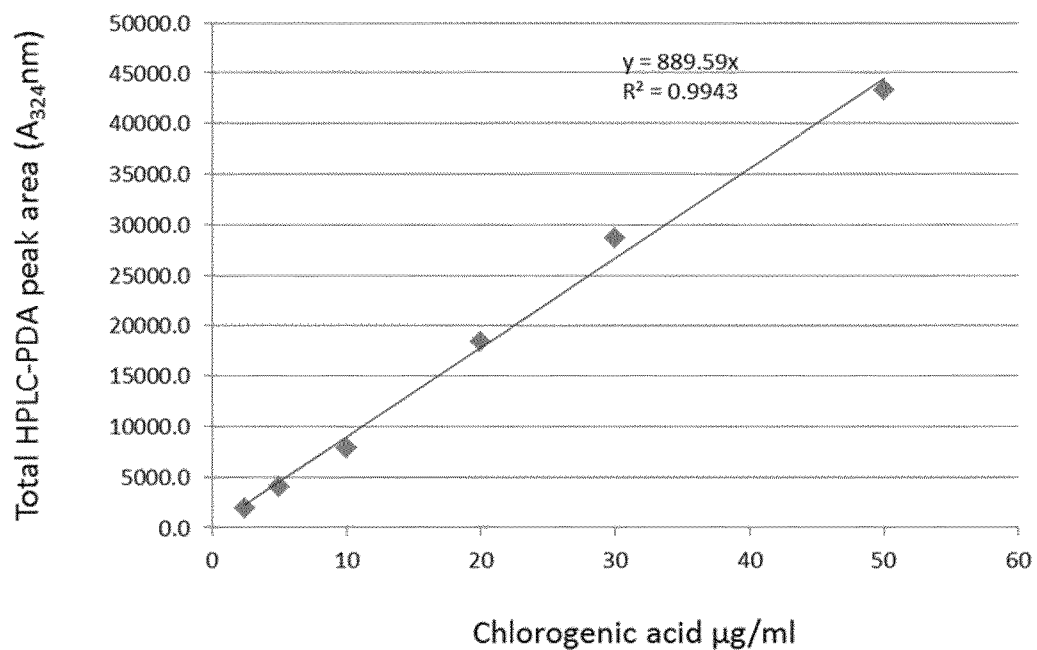
FIG. 3 is a calibration curve for chlorogenic acid.

30 coffee brews according to the invention and according to the prior art were prepared as mentioned above. Each coffee brew was filtered over a 0.45 µm teflon filter. All HPLC-PDA chromatographic conditions, including HPLC, column type and temperature, and eluent gradient are as described in (LIT1); a Synapt G1 QTOF MS (Waters, Etten-Leur, the Netherlands) in negative electrospray ionization mode was used detecting masses in a mass over charge (m/z) range of 90-1500. As the absorbance spectrum of (1-CQL) is similar to that of chlorogenic acid (FIG. 2), chlorogenic acid was used as a standard to quantify the level of 1-CQL. Chlorogenic acid (3-CGA), $C_{16}H_{18}O_9$, CAS Registry Number 327-97-9, was obtained from Sigma (order number C3878). The standard was dissolved in MilliQ water at a working solution of 1000 µg/ml (=2.82 mM, using a molecular weight of 354.31). The absorbance of a 100 fold dilution of this stock solution (i.e., read against water as a blank, at 324 nm ($A_{324}$) was 0.437. Using its molar absorption coefficient of 18,400 $M^{-1} \cdot cm^{-1}$ (Trogu et al, 1984. The Analyst, 109, 263-266), the actual concentration of this CGA solution was 23.75 µM. Thus, the purity of the stock solution was 84.16%. The stock solution was subsequently diluted into MilliQ towards concentrations ranging from 0 to 50 µg/ml. Injection of the highest concentration into the HPLC-PDA-MS system (FIG. 4) resulted in a large peak eluting at 14.4 minutes, corresponding to 3-CGA (Moco S, et al., 2006. Plant Physiology 141, 1205-18), as well as a minor peak eluting at 17.6 minutes corresponding to 4-CGA (Moco et al., 2006); other PDA or MS peaks were not detected. Upon injection of the chlorogenic acid stock solution at 10 µg/ml or lower, the 324 nm chromatograms showed 4 peaks eluting at a retention time of 10.2, 14.4, 15.2 and 17.5 minutes, respectively (FIG. 5). All of these 4 peaks were identified as chlorogenic acid isomers, based on both the specific accurate mass of the parent ions, $[M-H]^- = 353.08$, and their (in-source) quinic acid fragment, $[M-H]^- = 191.05$. As it is known that CGA's may isomerize in aqueous solutions (Xie C, et al., 2011, J. Agric. Food Chem. 59 (20), 11078-11087), the sum of the areas of these 4 chlorogenic acid isomers at 324 nm were used for constructing a chlorogenic acid calibration curve (FIG. 3). HPLC-PDA peak areas of 1-CQL at 324 nm were subsequently calculated (1.6% dry matter) and the level of the marker compound 1-CQL is expressed in µg chlorogenic acid equivalents, corrected by its impurity, per kg soluble solids of coffee concentrate.

The invention also pertains to a coffee concentrate, particularly as obtainable by the aforedescribed process, in any and all of its embodiments, comprising 15% to 55% dry solid matter, characterized by having a flavor profile represented by a 1-caffeoylquinic acid lactone (1-CQL) content of at least 450 mg) chlorogenic acid equivalents per kg of dry solid matter. The 1-CQL is thereby quantified as described above.

In an interesting embodiment, the 1-CQL content is at least 510 mg, in another interesting embodiment, the 1-CQL content is at least 590 mg per kg of dry solid matter.

Figure 4:
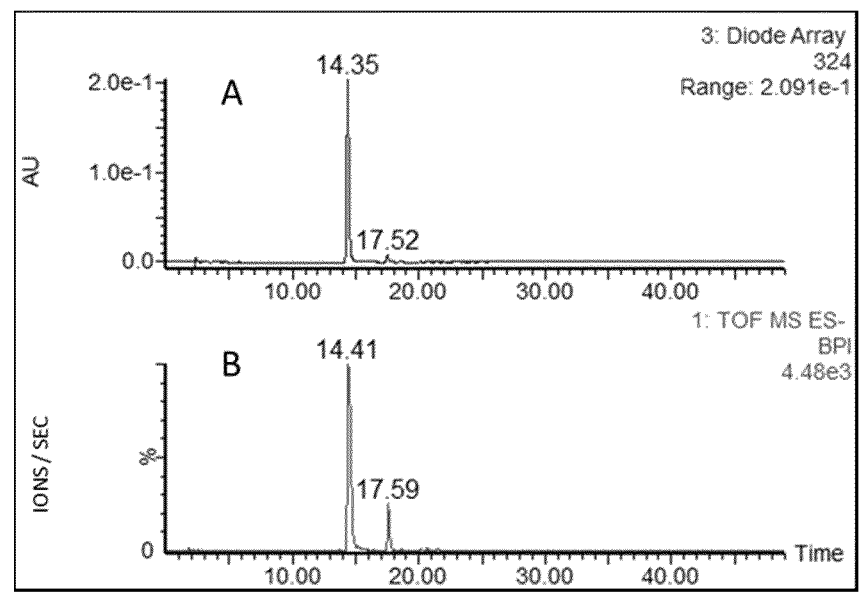
FIG. 4 is an HPLC-PDA-TOF MS chromatogram of a 5 µl injection of a chlorogenic acid standard solution at a concentration of 50 µg/ml.
Figure 5:
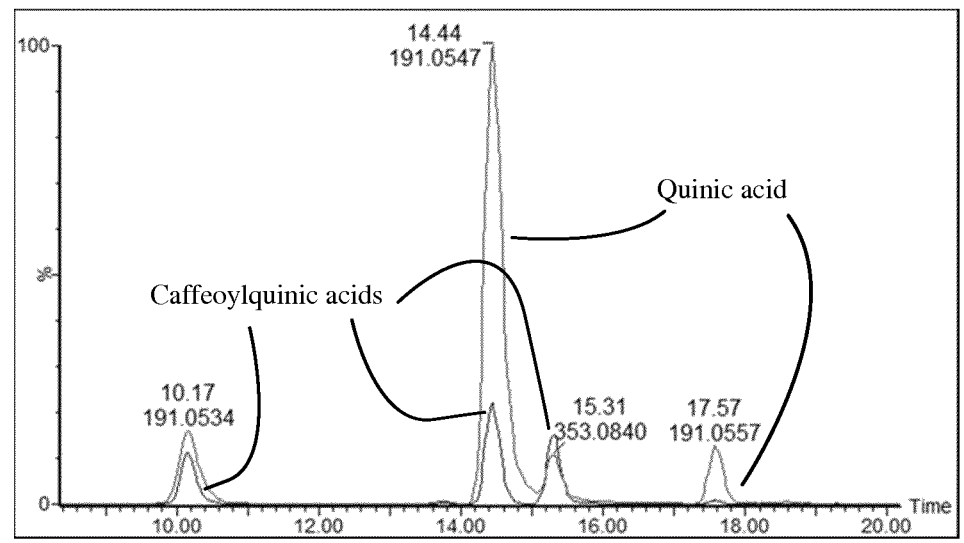
FIG. 5 is an HPLC-TOF MS chromatogram (ESI negative mode) of a chlorogenic acid standard at a concentration 10 µg/ml water.

FIG. 4 mentioned above is an HPLC-PDA-TOF MS chromatogram of a 5 µl injection of the chlorogenic acid standard solution at a concentration of 50 µg/ml, to check the purity of the calibration solution used in the quantification of (1-CQL). Upper panel (blue line): absorbance at 324 nm of PDA detector; lower panel (red line): Base-peak intensity (BPI) of TOF MS detector (m/z range 90-1500) in ESI-negative mode. The difference in retention times between both detectors for the same compound peak (0.065 min) is due to their physical distance within the analytical system. The main peak eluting at 14.35 minutes of retention corresponds to 3-CGA; the area of the isomer 4-CGA, eluting at 17.52 min, is 3.4% of the area of 3-CGA.

FIG. 5 mentioned above is an HPLC-TOF MS chromatogram (ESI negative mode) of the chlorogenic acid standard at a concentration 10 µg/ml water, showing 4 chromatographic peaks. Their accurate mass of m/z 353.08, i.e. caffeoylquinic acids (blue line) and their (in-source) fragment of m/z 191.05, i.e., quinic acid fragment (red line) indicate that all these 4 peaks are chlorogenic acid isomers. Area of each isomeric HPLC-PDA peak, detected at 324 nm using HPLC-PDA, was therefore integrated and added to calculate the total chlorogenic acid area per concentration of standard (see FIG. 3).

The invention will hereinafter be further explained with reference to the following, non-limiting examples.

Example 1

The principle of the invention is demonstrated on industrial scale in a diffusion battery of a series of fixed bed coffee extractors. A coffee blend composed of 60% washed Arabica coffees and 40% unwashed Arabica Coffees have been roasted in a batch roaster in 9:00 minutes with a decreasing roast air temperature. A degree of roast has been applied which resulted in a roast loss of 16.5% by weight. The moisture content of roasted coffee beans was 2.9% wt by weight.

Just before coffee extraction the roasted coffee beans were ground to an average ground size of 1.9 mm (according to calculation definition XMa-min given above).

The cells were loaded for 100% with ground coffee, no wetting of the ground coffee was applied before extraction.

A primary extraction was carried out counter currently with sodium desoftened water, wherein the feed water was introduced into the percolator in flow-up with a feed temperature of 95° C. The residence time of the coffee in the primary extraction section was 53 minutes and a water-to-coffee rate was applied of 6.0 with a back pressure of 2 Bar during air and coffee gas displacement from the percolator and after gas release the back pressure was raised to 4 Bar during collecting the primary draw-off from the percolator. The mass transfer Fourier number of the primary extraction was 0.70.

The primary extract was fractionated in a first primary draw-off with a draw-off rate of 0.60. A high aromatic first primary draw-off was obtained with a soluble solids content of 19.1% and cooled down below 25° C. before storage in a weighing tank. The first primary draw-off was cooled down below 6° C. during discharge of weighing tank. The residual low aromatic primary extract was collected in a storage tank as a second primary draw-off with a soluble solids content of 5.2% by weight and cooled down below 25° C. before storage in a weighing tank.

The partial extracted coffee grounds were subjected to a high temperature extraction in the secondary section of the diffusion battery. Condensate from the evaporator was recycled as feed water for the secondary extraction; the feed water was introduced into the percolator with a temperature of 158° C. The coffee residence time in the secondary section of the partial extracted coffee grounds was 145 minutes and a secondary draw-off was applied of 5.0 with a back pressure of 6 Bar. The soluble solids content of secondary draw-off was low 2.3% by weight. After extraction the spent coffee was discharged for energy recovery. The total extraction yield of the roast ground coffee was 32%.

Aroma is recovered from the second primary draw-off by means of atmospheric counter current steam stripping at 100° C. Just 25% of all second primary draw-offs is subjected to aroma-recovery in a column with static internals. The aroma laden steam is condensed in a 1 stage condenser at 6° C. The recovered aroma concentrate is mixed with the first primary draw-off.

The second primary extract is mixed with the second secondary draw-off to a mass balanced based on the actual extraction yields which results into a soluble solids content of 3.4% wt. This mixture is de-watered by means of evaporation to final soluble solids content of 48% by weight. The evaporator effluent is cooled down to 20° C.

The high aroma primary extract including recovered aroma is mixed in-line immediately after evaporation with the low aromatic coffee concentrate effluent from the evaporator. A final coffee concentrate is obtained of soluble solids content of at least 30% by weight which cooled down to 6° C.

Insoluble coffee particles present in the final coffee concentrate are separated. After clarification final product is packed in a Bag in Box Packaging (BiB) with a gear pump as disclosed, e.g., in WO 2014/003570. Coffee BiB's are frozen in freezing tunnels to a maximal temperature of −18° C.

The coffee concentrates were assessed by a panel of randomly selected consumers. The panel assessment:
  espresso: equal liking and equal sensorial profile (except less intense smell) as bean-to-cup Piazza d'Oro Forza from a Scharer PdO 500 Machine.
  lungo: higher liking and different sensorial profile (more smooth and mild) as bean-to-cup Piazza d'Oro Dolce from a Scharer PdO 500 Machine
  cappuccino: equal liking and equal sensorial profile as bean-to-cup Piazza d'Oro Forza from a Scharer PdO 500 Machine and full fat milk Example 2

Following the procedure of Example 1, coffee concentrates are manufactured, with the specific settings outlined in Table 2 below. The coffee blend used: 60 wt. % washed Arabica; 40% unwashed Arabica.

The 1-CQL content is 559 mg per kg of dry solid matter for the liquid concentrate obtained according to Example 2A and 622 mg per kg of dry solid matter for the liquid concentrate obtained according to Example 2B.

TABLE 2

| | Example settings | | |
|---|---|---|---|
| | 2A | 2B | 3 (prior art) |
| Degree of roast (Dr. Lange) | 38.1 | 43 | 53.9 |
| Time of roast (min:sec) | 9:00 | 9:00 | 5:30 |
| Particle size (Martin diameter minimal value, mm) | 1.9 | 1.9 | 3.6 |
| Cycle time (min) | 28.7 | 28.9 | 36.9 |
| Primary extraction (PE) | | | |
| feed temperature (° C.) | 94.2 | 94.7 | 95.2 |
| coffee residence time (min) | 52.4 | 52.8 | 73.8 |
| water to coffee rate (kg/kg) | 6.0 | 6.0 | 6.0 |
| feed water | Sodium softened | Sodium softened | Sodium softened and 1$^{st}$ draw secondary extract |
| Fourier mass transfer Number | 0.70 | 0.70 | 0.20 |
| 1st primary draw-off(kg/kg) | 0.62 | 0.60 | 0.47 |
| PE1 dry matter content (% solids) | 17.1 | 18.8 | 12.3 |
| PE1 yield (%) | 10.7 | 11.2 | 5.8 |
| 2nd primary draw-off (kg/kg) | 2.1 | 2.2 | 2.7 |
| PE2 dry matter content (%) | 5.6 | 4.9 | 5.4 |
| PE2 yield (%) | 11.7 | 10.9 | 14.6 |
| Secondary extraction | | | |
| feed temperature (° C.) | 158.0 | 158.3 | 167 |
| coffee residence time (min) | 143.3 | 144.4 | 147.6 |
| water to coffee rate (kg/kg) | 4.0 | 3.9 | 4.1 |
| 1$^{st}$ secondary draw-off (kg/kg) | 0 | 0 | 1.2 |
| 2$^{nd}$ secondary draw-off(kg/kg) | 4.0 | 3.9 | 2.9 |
| Secondary draw-off (kg/kg) | 4.0 | 3.9 | 4.1 |
| SE dry matter content (%) | 2.5 | 2.7 | 7.5 |
| yield (%) | 10.2 | 10.5 | 21.5 |
| Yield total extraction (TE, %) | 32.6 | 32.6 | 42.0 |
| Aroma recovery by steam stripping | | | |
| aroma to extract rate (kg/kg) | 0.024 | 0.024 | 0.014 |
| partial aroma addition (%) | 26.2 | 26.2 | 30 |
| Evaporation | | | |
| feed dry matter content (% dry matter content) | 3.5 | 3.5 | 5.2 |
| final soluble solids content (%) | 49.3 | 48.9 | 44.0 |
| Final product | | | |
| final soluble solids content (%) | 27.8 | 27.8 | 27.8 |
| Rate PE1 yield to TE yield | 0.33 | 0.34 | 0.14 |

Example 3 (Reference Example)

A coffee concentrate was made in accordance with the teaching in WO 2007/043873, with a coffee blend almost identical to that of Example 2 (65 wt. % washed Arabica; 35% unwashed Arabica), and the specific settings outlined in the above Table 2. The size of the coffee grounds (Martin diameter minimal value as defined in the description) was 3.6 mm. The mass transfer Fourier number was 0.20. The ratio of the yield obtained in the first primary extraction to the yield obtained in the total extraction was 13.9.

The 1-CQL content is 375 mg per kg of dry solid matter for the obtained liquid concentrate.

TABLE 3

| time [min] | average Martin Diameter [mm] | | | | | | | | | | | | | | | | | | | | | | | | | |
|---|---|---|---|---|---|---|---|---|---|---|---|---|---|---|---|---|---|---|---|---|---|---|---|---|---|---|
| | 0.5 | 0.6 | 0.7 | 0.8 | 0.9 | 1 | 1.1 | 1.2 | 1.3 | 1.4 | 1.5 | 1.6 | 1.7 | 1.8 | 1.9 | 2 | 2.1 | 2.2 | 2.3 | 2.4 | 2.5 | 2.6 | 2.7 | 2.8 | 2.9 | 3 |
| 1 | 0.12 | 0.08 | 0.06 | 0.05 | 0.04 | 0.03 | 0.02 | 0.02 | 0.02 | 0.02 | 0.01 | 0.01 | 0.01 | 0.01 | 0.01 | 0.01 | 0.01 | 0.01 | 0.01 | 0.01 | 0.00 | 0.00 | 0.00 | 0.00 | 0.00 | 0.00 |
| 2 | 0.24 | 0.16 | 0.12 | 0.09 | 0.07 | 0.06 | 0.05 | 0.04 | 0.03 | 0.03 | 0.03 | 0.02 | 0.02 | 0.02 | 0.02 | 0.01 | 0.01 | 0.01 | 0.01 | 0.01 | 0.01 | 0.01 | 0.01 | 0.01 | 0.01 | 0.01 |
| 3 | 0.35 | 0.25 | 0.18 | 0.14 | 0.11 | 0.09 | 0.07 | 0.06 | 0.05 | 0.05 | 0.04 | 0.03 | 0.03 | 0.03 | 0.02 | 0.02 | 0.02 | 0.02 | 0.02 | 0.02 | 0.01 | 0.01 | 0.01 | 0.01 | 0.01 | 0.01 |
| 4 | 0.47 | 0.33 | 0.24 | 0.18 | 0.15 | 0.12 | 0.10 | 0.08 | 0.07 | 0.06 | 0.05 | 0.05 | 0.04 | 0.04 | 0.03 | 0.03 | 0.03 | 0.02 | 0.02 | 0.02 | 0.02 | 0.02 | 0.02 | 0.02 | 0.01 | 0.01 |
| 5 | 0.59 | 0.41 | 0.30 | 0.23 | 0.18 | 0.15 | 0.12 | 0.10 | 0.09 | 0.08 | 0.07 | 0.06 | 0.05 | 0.05 | 0.04 | 0.04 | 0.03 | 0.03 | 0.03 | 0.03 | 0.02 | 0.02 | 0.02 | 0.02 | 0.02 | 0.02 |
| 6 | 0.71 | 0.49 | 0.36 | 0.28 | 0.22 | 0.18 | 0.15 | 0.12 | 0.10 | 0.09 | 0.08 | 0.07 | 0.06 | 0.05 | 0.05 | 0.04 | 0.04 | 0.04 | 0.03 | 0.03 | 0.03 | 0.03 | 0.02 | 0.02 | 0.02 | 0.02 |
| 7 | 0.83 | 0.57 | 0.42 | 0.32 | 0.26 | 0.21 | 0.17 | 0.14 | 0.12 | 0.11 | 0.09 | 0.08 | 0.07 | 0.06 | 0.06 | 0.05 | 0.05 | 0.04 | 0.04 | 0.03 | 0.03 | 0.03 | 0.03 | 0.03 | 0.02 | 0.02 |
| 8 | 0.94 | 0.66 | 0.48 | 0.37 | 0.29 | 0.24 | 0.20 | 0.16 | 0.14 | 0.12 | 0.10 | 0.09 | 0.08 | 0.07 | 0.06 | 0.06 | 0.05 | 0.05 | 0.04 | 0.04 | 0.04 | 0.03 | 0.03 | 0.03 | 0.03 | 0.03 |
| 9 | 1.06 | 0.74 | 0.54 | 0.42 | 0.33 | 0.27 | 0.22 | 0.18 | 0.16 | 0.14 | 0.12 | 0.10 | 0.09 | 0.08 | 0.07 | 0.07 | 0.06 | 0.05 | 0.05 | 0.04 | 0.04 | 0.04 | 0.04 | 0.03 | 0.03 | 0.03 |
| 10 | 1.18 | 0.82 | 0.60 | 0.46 | 0.36 | 0.30 | 0.24 | 0.21 | 0.17 | 0.15 | 0.13 | 0.12 | 0.10 | 0.09 | 0.08 | 0.07 | 0.07 | 0.06 | 0.05 | 0.05 | 0.05 | 0.04 | 0.04 | 0.04 | 0.04 | 0.03 |
| 11 | 1.30 | 0.90 | 0.66 | 0.51 | 0.40 | 0.32 | 0.27 | 0.23 | 0.19 | 0.17 | 0.14 | 0.13 | 0.11 | 0.10 | 0.09 | 0.08 | 0.07 | 0.07 | 0.06 | 0.06 | 0.05 | 0.05 | 0.04 | 0.04 | 0.04 | 0.04 |
| 12 | 1.42 | 0.98 | 0.72 | 0.55 | 0.44 | 0.35 | 0.29 | 0.25 | 0.21 | 0.18 | 0.16 | 0.14 | 0.12 | 0.11 | 0.10 | 0.09 | 0.08 | 0.07 | 0.07 | 0.06 | 0.06 | 0.05 | 0.05 | 0.04 | 0.04 | 0.04 |
| 13 | 1.54 | 1.07 | 0.78 | 0.60 | 0.47 | 0.38 | 0.32 | 0.27 | 0.23 | 0.20 | 0.17 | 0.15 | 0.13 | 0.12 | 0.11 | 0.10 | 0.09 | 0.08 | 0.07 | 0.07 | 0.06 | 0.06 | 0.05 | 0.05 | 0.05 | 0.05 |
| 14 | 1.65 | 1.15 | 0.84 | 0.65 | 0.51 | 0.41 | 0.34 | 0.29 | 0.24 | 0.21 | 0.18 | 0.16 | 0.14 | 0.13 | 0.11 | 0.10 | 0.09 | 0.09 | 0.08 | 0.07 | 0.07 | 0.06 | 0.06 | 0.05 | 0.05 | 0.05 |
| 15 | 1.77 | 1.23 | 0.90 | 0.69 | 0.55 | 0.44 | 0.37 | 0.31 | 0.26 | 0.23 | 0.20 | 0.17 | 0.15 | 0.14 | 0.12 | 0.11 | 0.10 | 0.09 | 0.08 | 0.08 | 0.07 | 0.07 | 0.06 | 0.06 | 0.05 | 0.05 |
| 16 | 1.89 | 1.31 | 0.96 | 0.74 | 0.58 | 0.47 | 0.39 | 0.33 | 0.28 | 0.24 | 0.21 | 0.18 | 0.16 | 0.15 | 0.13 | 0.12 | 0.11 | 0.10 | 0.09 | 0.08 | 0.08 | 0.07 | 0.06 | 0.06 | 0.06 | 0.05 |
| 17 | 2.01 | 1.39 | 1.02 | 0.78 | 0.62 | 0.50 | 0.41 | 0.35 | 0.30 | 0.26 | 0.22 | 0.20 | 0.17 | 0.15 | 0.14 | 0.13 | 0.11 | 0.10 | 0.09 | 0.09 | 0.08 | 0.07 | 0.07 | 0.06 | 0.06 | 0.06 |
| 18 | 2.13 | 1.48 | 1.08 | 0.83 | 0.66 | 0.53 | 0.44 | 0.37 | 0.31 | 0.27 | 0.24 | 0.21 | 0.18 | 0.16 | 0.15 | 0.13 | 0.12 | 0.11 | 0.10 | 0.09 | 0.08 | 0.08 | 0.07 | 0.07 | 0.06 | 0.06 |
| 19 | 2.24 | 1.56 | 1.14 | 0.88 | 0.69 | 0.56 | 0.46 | 0.39 | 0.33 | 0.29 | 0.25 | 0.22 | 0.19 | 0.17 | 0.16 | 0.14 | 0.13 | 0.12 | 0.11 | 0.10 | 0.09 | 0.08 | 0.08 | 0.07 | 0.07 | 0.06 |
| 20 | 2.36 | 1.64 | 1.20 | 0.92 | 0.73 | 0.59 | 0.49 | 0.41 | 0.35 | 0.30 | 0.26 | 0.23 | 0.20 | 0.18 | 0.16 | 0.15 | 0.13 | 0.12 | 0.11 | 0.10 | 0.09 | 0.09 | 0.08 | 0.08 | 0.07 | 0.07 |
| 21 | 2.48 | 1.72 | 1.27 | 0.97 | 0.77 | 0.62 | 0.51 | 0.43 | 0.37 | 0.32 | 0.28 | 0.24 | 0.21 | 0.19 | 0.17 | 0.15 | 0.14 | 0.13 | 0.12 | 0.11 | 0.10 | 0.09 | 0.09 | 0.08 | 0.07 | 0.07 |
| 22 | 2.60 | 1.80 | 1.33 | 1.01 | 0.80 | 0.65 | 0.54 | 0.45 | 0.38 | 0.33 | 0.29 | 0.25 | 0.22 | 0.20 | 0.18 | 0.16 | 0.15 | 0.13 | 0.12 | 0.11 | 0.10 | 0.10 | 0.09 | 0.08 | 0.08 | 0.07 |
| 23 | 2.72 | 1.89 | 1.39 | 1.06 | 0.84 | 0.68 | 0.56 | 0.47 | 0.40 | 0.35 | 0.30 | 0.27 | 0.23 | 0.21 | 0.19 | 0.17 | 0.15 | 0.14 | 0.13 | 0.12 | 0.11 | 0.10 | 0.09 | 0.09 | 0.08 | 0.08 |
| 24 | 2.83 | 1.97 | 1.45 | 1.11 | 0.87 | 0.71 | 0.59 | 0.49 | 0.42 | 0.36 | 0.31 | 0.28 | 0.25 | 0.22 | 0.20 | 0.18 | 0.16 | 0.15 | 0.13 | 0.12 | 0.11 | 0.10 | 0.10 | 0.09 | 0.08 | 0.08 |
| 25 | 2.95 | 2.05 | 1.51 | 1.15 | 0.91 | 0.74 | 0.61 | 0.51 | 0.44 | 0.38 | 0.33 | 0.29 | 0.26 | 0.23 | 0.20 | 0.18 | 0.17 | 0.15 | 0.14 | 0.13 | 0.12 | 0.11 | 0.10 | 0.09 | 0.09 | 0.08 |
| 26 | 3.1 | 2.13 | 1.57 | 1.20 | 0.95 | 0.77 | 0.63 | 0.53 | 0.45 | 0.39 | 0.34 | 0.30 | 0.27 | 0.24 | 0.21 | 0.19 | 0.17 | 0.16 | 0.14 | 0.13 | 0.12 | 0.11 | 0.10 | 0.10 | 0.09 | 0.09 |
| 27 | 3.2 | 2.21 | 1.63 | 1.25 | 0.98 | 0.80 | 0.66 | 0.55 | 0.47 | 0.41 | 0.35 | 0.31 | 0.28 | 0.25 | 0.22 | 0.20 | 0.18 | 0.16 | 0.15 | 0.14 | 0.12 | 0.12 | 0.11 | 0.10 | 0.09 | 0.09 |
| 28 | 3.3 | 2.30 | 1.69 | 1.29 | 1.02 | 0.83 | 0.68 | 0.57 | 0.49 | 0.42 | 0.37 | 0.32 | 0.29 | 0.26 | 0.23 | 0.21 | 0.19 | 0.17 | 0.16 | 0.14 | 0.13 | 0.12 | 0.11 | 0.11 | 0.10 | 0.09 |
| 29 | 3.4 | 2.38 | 1.75 | 1.34 | 1.06 | 0.86 | 0.71 | 0.59 | 0.51 | 0.44 | 0.38 | 0.33 | 0.30 | 0.26 | 0.24 | 0.21 | 0.19 | 0.18 | 0.16 | 0.15 | 0.14 | 0.13 | 0.12 | 0.11 | 0.10 | 0.10 |
| 30 | 3.5 | 2.46 | 1.81 | 1.38 | 1.09 | 0.89 | 0.73 | 0.62 | 0.52 | 0.45 | 0.39 | 0.35 | 0.31 | 0.27 | 0.25 | 0.22 | 0.20 | 0.18 | 0.17 | 0.15 | 0.14 | 0.13 | 0.12 | 0.11 | 0.11 | 0.10 |
| 31 | 3.7 | 2.54 | 1.87 | 1.43 | 1.13 | 0.92 | 0.76 | 0.64 | 0.54 | 0.47 | 0.41 | 0.36 | 0.32 | 0.28 | 0.25 | 0.23 | 0.21 | 0.19 | 0.17 | 0.16 | 0.15 | 0.14 | 0.13 | 0.12 | 0.11 | 0.10 |
| 32 | 3.8 | 2.62 | 1.93 | 1.48 | 1.17 | 0.94 | 0.78 | 0.66 | 0.56 | 0.48 | 0.42 | 0.37 | 0.33 | 0.29 | 0.26 | 0.24 | 0.21 | 0.20 | 0.18 | 0.16 | 0.15 | 0.14 | 0.13 | 0.12 | 0.11 | 0.10 |

TABLE 3-continued

| time [min] | average Martin Diameter [mm] | | | | | | | | | | | | | | | | | | | | | | | | |
|---|---|---|---|---|---|---|---|---|---|---|---|---|---|---|---|---|---|---|---|---|---|---|---|---|---|
| | 0.5 | 0.6 | 0.7 | 0.8 | 0.9 | 1 | 1.1 | 1.2 | 1.3 | 1.4 | 1.5 | 1.6 | 1.7 | 1.8 | 1.9 | 2 | 2.1 | 2.2 | 2.3 | 2.4 | 2.5 | 2.6 | 2.7 | 2.8 | 2.9 | 3 |
| 33 | 3.9 | 2.71 | 1.99 | 1.52 | 1.20 | 0.97 | 0.81 | 0.68 | 0.58 | 0.50 | 0.43 | 0.38 | 0.34 | 0.30 | 0.27 | 0.24 | 0.22 | 0.20 | 0.18 | 0.17 | 0.16 | 0.14 | 0.13 | 0.12 | 0.12 | 0.11 |
| 34 | 4.0 | 2.79 | 2.05 | 1.57 | 1.24 | 1.00 | 0.83 | 0.70 | 0.59 | 0.51 | 0.45 | 0.39 | 0.35 | 0.31 | 0.28 | 0.25 | 0.23 | 0.21 | 0.19 | 0.17 | 0.16 | 0.15 | 0.14 | 0.13 | 0.12 | 0.11 |
| 35 | 4.1 | 2.87 | 2.11 | 1.61 | 1.28 | 1.03 | 0.85 | 0.72 | 0.61 | 0.53 | 0.46 | 0.40 | 0.36 | 0.32 | 0.29 | 0.26 | 0.23 | 0.21 | 0.20 | 0.18 | 0.17 | 0.15 | 0.14 | 0.13 | 0.12 | 0.11 |
| 36 | 4.3 | 2.95 | 2.17 | 1.66 | 1.31 | 1.06 | 0.88 | 0.74 | 0.63 | 0.54 | 0.47 | 0.42 | 0.37 | 0.33 | 0.29 | 0.27 | 0.24 | 0.22 | 0.20 | 0.19 | 0.17 | 0.16 | 0.15 | 0.14 | 0.13 | 0.12 |
| 37 | 4.4 | 3.0 | 2.23 | 1.71 | 1.35 | 1.09 | 0.90 | 0.76 | 0.65 | 0.56 | 0.49 | 0.43 | 0.38 | 0.34 | 0.30 | 0.27 | 0.25 | 0.23 | 0.21 | 0.19 | 0.18 | 0.16 | 0.15 | 0.14 | 0.13 | 0.12 |
| 38 | 4.5 | 3.1 | 2.29 | 1.75 | 1.38 | 1.12 | 0.93 | 0.78 | 0.66 | 0.57 | 0.50 | 0.44 | 0.39 | 0.35 | 0.31 | 0.28 | 0.25 | 0.23 | 0.21 | 0.20 | 0.18 | 0.17 | 0.15 | 0.14 | 0.13 | 0.12 |
| 39 | 4.6 | 3.2 | 2.35 | 1.80 | 1.42 | 1.15 | 0.95 | 0.80 | 0.68 | 0.59 | 0.51 | 0.45 | 0.40 | 0.36 | 0.32 | 0.29 | 0.26 | 0.24 | 0.22 | 0.20 | 0.18 | 0.17 | 0.16 | 0.15 | 0.14 | 0.13 |
| 40 | 4.7 | 3.3 | 2.41 | 1.85 | 1.46 | 1.18 | 0.98 | 0.82 | 0.70 | 0.60 | 0.52 | 0.46 | 0.41 | 0.36 | 0.33 | 0.29 | 0.27 | 0.24 | 0.22 | 0.20 | 0.19 | 0.17 | 0.16 | 0.15 | 0.14 | 0.13 |
| 41 | 4.8 | 3.4 | 2.47 | 1.89 | 1.49 | 1.21 | 1.00 | 0.84 | 0.72 | 0.62 | 0.54 | 0.47 | 0.42 | 0.37 | 0.34 | 0.30 | 0.27 | 0.25 | 0.23 | 0.21 | 0.19 | 0.18 | 0.17 | 0.15 | 0.14 | 0.13 |
| 42 | 5.0 | 3.4 | 2.53 | 1.94 | 1.53 | 1.24 | 1.02 | 0.86 | 0.73 | 0.63 | 0.55 | 0.48 | 0.43 | 0.38 | 0.34 | 0.31 | 0.28 | 0.26 | 0.23 | 0.21 | 0.20 | 0.18 | 0.17 | 0.15 | 0.14 | 0.13 |
| 43 | 5.1 | 3.5 | 2.59 | 1.98 | 1.57 | 1.27 | 1.05 | 0.88 | 0.75 | 0.65 | 0.56 | 0.50 | 0.44 | 0.39 | 0.35 | 0.32 | 0.29 | 0.26 | 0.24 | 0.22 | 0.20 | 0.19 | 0.17 | 0.16 | 0.15 | 0.14 |
| 44 | 5.2 | 3.6 | 2.65 | 2.03 | 1.60 | 1.30 | 1.07 | 0.90 | 0.77 | 0.66 | 0.58 | 0.51 | 0.45 | 0.40 | 0.36 | 0.32 | 0.29 | 0.27 | 0.25 | 0.23 | 0.21 | 0.19 | 0.18 | 0.16 | 0.15 | 0.14 |
| 45 | 5.3 | 3.7 | 2.71 | 2.08 | 1.64 | 1.33 | 1.10 | 0.92 | 0.79 | 0.68 | 0.59 | 0.52 | 0.46 | 0.41 | 0.37 | 0.33 | 0.30 | 0.27 | 0.25 | 0.23 | 0.21 | 0.20 | 0.18 | 0.17 | 0.16 | 0.15 |
| 46 | 5.4 | 3.8 | 2.77 | 2.12 | 1.68 | 1.36 | 1.12 | 0.94 | 0.80 | 0.69 | 0.60 | 0.53 | 0.47 | 0.42 | 0.38 | 0.34 | 0.31 | 0.28 | 0.26 | 0.24 | 0.22 | 0.20 | 0.19 | 0.17 | 0.16 | 0.15 |
| 47 | 5.5 | 3.9 | 2.83 | 2.17 | 1.71 | 1.39 | 1.15 | 0.96 | 0.82 | 0.71 | 0.62 | 0.54 | 0.48 | 0.43 | 0.38 | 0.35 | 0.31 | 0.29 | 0.26 | 0.24 | 0.22 | 0.20 | 0.19 | 0.18 | 0.16 | 0.15 |
| 48 | 5.7 | 3.9 | 2.89 | 2.21 | 1.75 | 1.42 | 1.17 | 0.98 | 0.84 | 0.72 | 0.63 | 0.55 | 0.49 | 0.44 | 0.39 | 0.35 | 0.32 | 0.29 | 0.27 | 0.25 | 0.23 | 0.21 | 0.19 | 0.18 | 0.17 | 0.16 |
| 49 | 5.8 | 4.0 | 2.95 | 2.26 | 1.79 | 1.45 | 1.20 | 1.00 | 0.86 | 0.74 | 0.64 | 0.57 | 0.50 | 0.45 | 0.40 | 0.36 | 0.33 | 0.30 | 0.27 | 0.25 | 0.23 | 0.21 | 0.20 | 0.18 | 0.17 | 0.16 |
| 50 | 5.9 | 4.1 | 3.0 | 2.31 | 1.82 | 1.48 | 1.22 | 1.03 | 0.87 | 0.75 | 0.66 | 0.58 | 0.51 | 0.46 | 0.41 | 0.37 | 0.33 | 0.30 | 0.28 | 0.25 | 0.24 | 0.22 | 0.20 | 0.19 | 0.17 | 0.16 |
| 51 | 6.0 | 4.2 | 3.1 | 2.35 | 1.86 | 1.51 | 1.24 | 1.05 | 0.89 | 0.77 | 0.67 | 0.59 | 0.52 | 0.46 | 0.42 | 0.38 | 0.34 | 0.31 | 0.28 | 0.26 | 0.24 | 0.22 | 0.21 | 0.19 | 0.18 | 0.17 |
| 52 | 6.1 | 4.3 | 3.1 | 2.40 | 1.90 | 1.54 | 1.27 | 1.07 | 0.91 | 0.78 | 0.68 | 0.60 | 0.53 | 0.47 | 0.43 | 0.38 | 0.35 | 0.32 | 0.29 | 0.27 | 0.25 | 0.23 | 0.21 | 0.19 | 0.18 | 0.17 |
| 53 | 6.3 | 4.3 | 3.2 | 2.44 | 1.93 | 1.56 | 1.29 | 1.09 | 0.93 | 0.80 | 0.70 | 0.61 | 0.54 | 0.48 | 0.43 | 0.39 | 0.35 | 0.32 | 0.30 | 0.27 | 0.25 | 0.23 | 0.21 | 0.20 | 0.19 | 0.17 |
| 54 | 6.4 | 4.4 | 3.3 | 2.49 | 1.97 | 1.59 | 1.32 | 1.11 | 0.94 | 0.81 | 0.71 | 0.62 | 0.55 | 0.49 | 0.44 | 0.40 | 0.36 | 0.33 | 0.30 | 0.28 | 0.26 | 0.24 | 0.22 | 0.20 | 0.19 | 0.18 |
| 55 | 6.5 | 4.5 | 3.3 | 2.54 | 2.00 | 1.62 | 1.34 | 1.13 | 0.96 | 0.83 | 0.72 | 0.63 | 0.56 | 0.50 | 0.45 | 0.41 | 0.37 | 0.34 | 0.31 | 0.28 | 0.26 | 0.24 | 0.22 | 0.21 | 0.19 | 0.18 |
| 56 | 6.6 | 4.6 | 3.4 | 2.58 | 2.04 | 1.65 | 1.37 | 1.15 | 0.98 | 0.84 | 0.73 | 0.65 | 0.57 | 0.51 | 0.46 | 0.41 | 0.37 | 0.34 | 0.31 | 0.29 | 0.26 | 0.24 | 0.23 | 0.21 | 0.19 | 0.18 |
| 57 | 6.7 | 4.7 | 3.4 | 2.63 | 2.08 | 1.68 | 1.39 | 1.17 | 1.00 | 0.86 | 0.75 | 0.66 | 0.58 | 0.52 | 0.47 | 0.42 | 0.38 | 0.35 | 0.32 | 0.29 | 0.27 | 0.25 | 0.23 | 0.21 | 0.20 | 0.18 |
| 58 | 6.8 | 4.8 | 3.5 | 2.68 | 2.11 | 1.71 | 1.42 | 1.19 | 1.01 | 0.87 | 0.76 | 0.67 | 0.59 | 0.53 | 0.47 | 0.43 | 0.39 | 0.35 | 0.32 | 0.30 | 0.27 | 0.25 | 0.23 | 0.22 | 0.20 | 0.19 |
| 59 | 7.0 | 4.8 | 3.6 | 2.72 | 2.15 | 1.74 | 1.44 | 1.21 | 1.03 | 0.89 | 0.77 | 0.68 | 0.60 | 0.54 | 0.48 | 0.44 | 0.39 | 0.36 | 0.33 | 0.30 | 0.28 | 0.26 | 0.24 | 0.22 | 0.21 | 0.19 |
| 60 | 7.1 | 4.9 | 3.6 | 2.77 | 2.19 | 1.77 | 1.46 | 1.23 | 1.05 | 0.90 | 0.79 | 0.69 | 0.61 | 0.55 | 0.49 | 0.44 | 0.40 | 0.37 | 0.33 | 0.31 | 0.28 | 0.26 | 0.24 | 0.23 | 0.21 | 0.20 |

TABLE 4

| time [min] | average Martin Diameter [mm] | | | | | | | | | | | | | | | | | | | | | | | | | |
|---|---|---|---|---|---|---|---|---|---|---|---|---|---|---|---|---|---|---|---|---|---|---|---|---|---|---|
| | 0.5 | 0.6 | 0.7 | 0.8 | 0.9 | 1 | 1.1 | 1.2 | 1.3 | 1.4 | 1.5 | 1.6 | 1.7 | 1.8 | 1.9 | 2 | 2.1 | 2.2 | 2.3 | 2.4 | 2.5 | 2.6 | 2.7 | 2.8 | 2.9 | 3 |
| 1 | 0.14 | 0.10 | 0.07 | 0.05 | 0.04 | 0.03 | 0.03 | 0.02 | 0.02 | 0.02 | 0.02 | 0.01 | 0.01 | 0.01 | 0.01 | 0.01 | 0.01 | 0.01 | 0.01 | 0.01 | 0.01 | 0.01 | 0.00 | 0.00 | 0.00 | 0.00 |
| 2 | 0.28 | 0.19 | 0.14 | 0.11 | 0.09 | 0.07 | 0.06 | 0.05 | 0.04 | 0.04 | 0.03 | 0.03 | 0.02 | 0.02 | 0.02 | 0.02 | 0.02 | 0.01 | 0.01 | 0.01 | 0.01 | 0.01 | 0.01 | 0.01 | 0.01 | 0.01 |
| 3 | 0.42 | 0.29 | 0.21 | 0.16 | 0.13 | 0.10 | 0.09 | 0.07 | 0.06 | 0.05 | 0.05 | 0.04 | 0.03 | 0.03 | 0.03 | 0.03 | 0.02 | 0.02 | 0.02 | 0.02 | 0.02 | 0.02 | 0.01 | 0.01 | 0.01 | 0.01 |
| 4 | 0.56 | 0.39 | 0.28 | 0.22 | 0.17 | 0.14 | 0.12 | 0.10 | 0.08 | 0.07 | 0.06 | 0.05 | 0.05 | 0.04 | 0.04 | 0.03 | 0.03 | 0.03 | 0.03 | 0.02 | 0.02 | 0.02 | 0.02 | 0.02 | 0.02 | 0.02 |
| 5 | 0.70 | 0.48 | 0.36 | 0.27 | 0.21 | 0.17 | 0.14 | 0.12 | 0.10 | 0.09 | 0.08 | 0.07 | 0.06 | 0.05 | 0.05 | 0.04 | 0.04 | 0.04 | 0.03 | 0.03 | 0.03 | 0.03 | 0.02 | 0.02 | 0.02 | 0.02 |
| 6 | 0.84 | 0.58 | 0.43 | 0.33 | 0.26 | 0.21 | 0.17 | 0.15 | 0.12 | 0.11 | 0.09 | 0.08 | 0.07 | 0.06 | 0.06 | 0.05 | 0.05 | 0.04 | 0.04 | 0.04 | 0.03 | 0.03 | 0.03 | 0.03 | 0.03 | 0.02 |
| 7 | 0.97 | 0.68 | 0.50 | 0.38 | 0.30 | 0.24 | 0.20 | 0.17 | 0.14 | 0.12 | 0.11 | 0.10 | 0.08 | 0.08 | 0.07 | 0.06 | 0.06 | 0.05 | 0.05 | 0.04 | 0.04 | 0.04 | 0.04 | 0.03 | 0.03 | 0.03 |
| 8 | 1.11 | 0.77 | 0.57 | 0.44 | 0.34 | 0.28 | 0.23 | 0.19 | 0.16 | 0.14 | 0.12 | 0.11 | 0.10 | 0.09 | 0.08 | 0.07 | 0.06 | 0.06 | 0.05 | 0.05 | 0.04 | 0.04 | 0.04 | 0.04 | 0.04 | 0.03 |
| 9 | 1.25 | 0.87 | 0.64 | 0.49 | 0.39 | 0.31 | 0.26 | 0.22 | 0.19 | 0.16 | 0.14 | 0.12 | 0.11 | 0.10 | 0.09 | 0.08 | 0.07 | 0.06 | 0.06 | 0.05 | 0.05 | 0.05 | 0.04 | 0.04 | 0.04 | 0.03 |
| 10 | 1.39 | 0.97 | 0.71 | 0.54 | 0.43 | 0.35 | 0.29 | 0.24 | 0.21 | 0.18 | 0.15 | 0.14 | 0.12 | 0.11 | 0.10 | 0.09 | 0.08 | 0.07 | 0.07 | 0.06 | 0.06 | 0.05 | 0.05 | 0.04 | 0.04 | 0.04 |
| 11 | 1.53 | 1.06 | 0.78 | 0.60 | 0.47 | 0.38 | 0.32 | 0.27 | 0.23 | 0.20 | 0.17 | 0.15 | 0.13 | 0.12 | 0.11 | 0.10 | 0.09 | 0.08 | 0.07 | 0.07 | 0.06 | 0.06 | 0.05 | 0.05 | 0.05 | 0.04 |
| 12 | 1.67 | 1.16 | 0.85 | 0.65 | 0.52 | 0.42 | 0.35 | 0.29 | 0.25 | 0.21 | 0.19 | 0.16 | 0.14 | 0.13 | 0.12 | 0.10 | 0.10 | 0.09 | 0.08 | 0.07 | 0.07 | 0.06 | 0.06 | 0.05 | 0.05 | 0.05 |
| 13 | 1.81 | 1.26 | 0.92 | 0.71 | 0.56 | 0.45 | 0.37 | 0.31 | 0.27 | 0.23 | 0.20 | 0.18 | 0.16 | 0.14 | 0.13 | 0.11 | 0.10 | 0.09 | 0.09 | 0.08 | 0.07 | 0.07 | 0.06 | 0.06 | 0.05 | 0.05 |
| 14 | 1.95 | 1.35 | 0.99 | 0.76 | 0.60 | 0.49 | 0.40 | 0.34 | 0.29 | 0.25 | 0.22 | 0.19 | 0.17 | 0.15 | 0.13 | 0.12 | 0.11 | 0.10 | 0.09 | 0.09 | 0.08 | 0.07 | 0.07 | 0.06 | 0.06 | 0.05 |
| 15 | 2.09 | 1.45 | 1.07 | 0.82 | 0.64 | 0.52 | 0.43 | 0.36 | 0.31 | 0.27 | 0.23 | 0.20 | 0.18 | 0.16 | 0.14 | 0.13 | 0.12 | 0.11 | 0.10 | 0.09 | 0.08 | 0.08 | 0.07 | 0.07 | 0.06 | 0.06 |
| 16 | 2.23 | 1.55 | 1.14 | 0.87 | 0.69 | 0.56 | 0.46 | 0.39 | 0.33 | 0.28 | 0.25 | 0.22 | 0.19 | 0.17 | 0.15 | 0.14 | 0.13 | 0.11 | 0.11 | 0.10 | 0.09 | 0.08 | 0.08 | 0.07 | 0.07 | 0.06 |
| 17 | 2.37 | 1.64 | 1.21 | 0.92 | 0.73 | 0.59 | 0.49 | 0.41 | 0.35 | 0.30 | 0.26 | 0.23 | 0.20 | 0.18 | 0.16 | 0.15 | 0.13 | 0.12 | 0.11 | 0.10 | 0.09 | 0.09 | 0.08 | 0.08 | 0.07 | 0.07 |
| 18 | 2.51 | 1.74 | 1.28 | 0.98 | 0.77 | 0.63 | 0.52 | 0.44 | 0.37 | 0.32 | 0.28 | 0.24 | 0.22 | 0.19 | 0.17 | 0.16 | 0.14 | 0.13 | 0.12 | 0.11 | 0.10 | 0.09 | 0.08 | 0.08 | 0.07 | 0.07 |
| 19 | 2.64 | 1.84 | 1.35 | 1.03 | 0.82 | 0.66 | 0.55 | 0.46 | 0.39 | 0.34 | 0.29 | 0.26 | 0.23 | 0.20 | 0.18 | 0.17 | 0.15 | 0.14 | 0.12 | 0.11 | 0.10 | 0.10 | 0.09 | 0.08 | 0.08 | 0.07 |
| 20 | 2.78 | 1.93 | 1.42 | 1.09 | 0.86 | 0.70 | 0.58 | 0.48 | 0.41 | 0.36 | 0.31 | 0.27 | 0.24 | 0.21 | 0.19 | 0.17 | 0.16 | 0.14 | 0.13 | 0.12 | 0.11 | 0.10 | 0.09 | 0.09 | 0.08 | 0.08 |
| 21 | 2.92 | 2.03 | 1.49 | 1.14 | 0.90 | 0.73 | 0.60 | 0.51 | 0.43 | 0.37 | 0.32 | 0.29 | 0.25 | 0.23 | 0.20 | 0.18 | 0.17 | 0.15 | 0.14 | 0.13 | 0.12 | 0.11 | 0.10 | 0.09 | 0.09 | 0.08 |
| 22 | 3.1 | 2.13 | 1.56 | 1.20 | 0.95 | 0.77 | 0.63 | 0.53 | 0.45 | 0.39 | 0.34 | 0.30 | 0.26 | 0.24 | 0.21 | 0.19 | 0.17 | 0.16 | 0.14 | 0.13 | 0.12 | 0.11 | 0.11 | 0.10 | 0.09 | 0.09 |
| 23 | 3.2 | 2.22 | 1.63 | 1.25 | 0.99 | 0.80 | 0.66 | 0.56 | 0.47 | 0.41 | 0.36 | 0.31 | 0.28 | 0.25 | 0.22 | 0.20 | 0.18 | 0.17 | 0.15 | 0.14 | 0.13 | 0.12 | 0.11 | 0.10 | 0.10 | 0.09 |
| 24 | 3.3 | 2.32 | 1.70 | 1.31 | 1.03 | 0.84 | 0.69 | 0.58 | 0.49 | 0.43 | 0.37 | 0.33 | 0.29 | 0.26 | 0.23 | 0.21 | 0.19 | 0.17 | 0.16 | 0.15 | 0.13 | 0.12 | 0.11 | 0.11 | 0.10 | 0.09 |
| 25 | 3.5 | 2.42 | 1.78 | 1.36 | 1.07 | 0.87 | 0.72 | 0.60 | 0.51 | 0.44 | 0.39 | 0.34 | 0.30 | 0.27 | 0.24 | 0.22 | 0.20 | 0.18 | 0.16 | 0.15 | 0.14 | 0.13 | 0.12 | 0.11 | 0.10 | 0.10 |
| 26 | 3.6 | 2.51 | 1.85 | 1.41 | 1.12 | 0.90 | 0.75 | 0.63 | 0.54 | 0.46 | 0.40 | 0.35 | 0.31 | 0.28 | 0.25 | 0.23 | 0.21 | 0.19 | 0.17 | 0.16 | 0.14 | 0.13 | 0.12 | 0.12 | 0.11 | 0.10 |
| 27 | 3.8 | 2.61 | 1.92 | 1.47 | 1.16 | 0.94 | 0.78 | 0.65 | 0.56 | 0.48 | 0.42 | 0.37 | 0.33 | 0.29 | 0.26 | 0.23 | 0.21 | 0.19 | 0.18 | 0.16 | 0.15 | 0.14 | 0.13 | 0.12 | 0.11 | 0.10 |
| 28 | 3.9 | 2.71 | 1.99 | 1.52 | 1.20 | 0.97 | 0.81 | 0.68 | 0.58 | 0.50 | 0.43 | 0.38 | 0.34 | 0.30 | 0.27 | 0.24 | 0.22 | 0.20 | 0.18 | 0.17 | 0.16 | 0.14 | 0.13 | 0.12 | 0.12 | 0.11 |
| 29 | 4.0 | 2.80 | 2.06 | 1.58 | 1.25 | 1.01 | 0.83 | 0.70 | 0.60 | 0.51 | 0.45 | 0.39 | 0.35 | 0.31 | 0.28 | 0.25 | 0.23 | 0.21 | 0.19 | 0.18 | 0.16 | 0.15 | 0.14 | 0.13 | 0.12 | 0.11 |
| 30 | 4.2 | 2.90 | 2.13 | 1.63 | 1.29 | 1.04 | 0.86 | 0.73 | 0.62 | 0.53 | 0.46 | 0.41 | 0.36 | 0.32 | 0.29 | 0.26 | 0.24 | 0.22 | 0.20 | 0.18 | 0.17 | 0.15 | 0.14 | 0.13 | 0.12 | 0.12 |
| 31 | 4.3 | 3.0 | 2.20 | 1.69 | 1.33 | 1.08 | 0.89 | 0.75 | 0.64 | 0.55 | 0.48 | 0.42 | 0.37 | 0.33 | 0.30 | 0.27 | 0.24 | 0.22 | 0.20 | 0.19 | 0.17 | 0.16 | 0.15 | 0.14 | 0.13 | 0.12 |
| 32 | 4.5 | 3.1 | 2.27 | 1.74 | 1.37 | 1.11 | 0.92 | 0.77 | 0.66 | 0.57 | 0.49 | 0.44 | 0.39 | 0.34 | 0.31 | 0.28 | 0.25 | 0.23 | 0.21 | 0.19 | 0.18 | 0.16 | 0.15 | 0.14 | 0.13 | 0.12 |

TABLE 4-continued

| time [min] | \multicolumn{26}{c}{average Martin Diameter [mm]} | | | | | | | | | | | | | | | | | | | | | | | | | |
|---|---|---|---|---|---|---|---|---|---|---|---|---|---|---|---|---|---|---|---|---|---|---|---|---|---|---|
| | 0.5 | 0.6 | 0.7 | 0.8 | 0.9 | 1 | 1.1 | 1.2 | 1.3 | 1.4 | 1.5 | 1.6 | 1.7 | 1.8 | 1.9 | 2 | 2.1 | 2.2 | 2.3 | 2.4 | 2.5 | 2.6 | 2.7 | 2.8 | 2.9 | 3 |
| 33 | 4.6 | 3.2 | 2.34 | 1.79 | 1.42 | 1.15 | 0.95 | 0.80 | 0.68 | 0.59 | 0.51 | 0.45 | 0.40 | 0.35 | 0.32 | 0.29 | 0.26 | 0.24 | 0.22 | 0.20 | 0.18 | 0.17 | 0.16 | 0.15 | 0.14 | 0.13 |
| 34 | 4.7 | 3.3 | 2.41 | 1.85 | 1.46 | 1.18 | 0.98 | 0.82 | 0.70 | 0.60 | 0.53 | 0.46 | 0.41 | 0.37 | 0.33 | 0.30 | 0.27 | 0.24 | 0.22 | 0.21 | 0.19 | 0.18 | 0.16 | 0.15 | 0.14 | 0.13 |
| 35 | 4.9 | 3.4 | 2.49 | 1.90 | 1.50 | 1.22 | 1.01 | 0.85 | 0.72 | 0.62 | 0.54 | 0.48 | 0.42 | 0.38 | 0.34 | 0.30 | 0.28 | 0.25 | 0.23 | 0.21 | 0.19 | 0.18 | 0.17 | 0.16 | 0.14 | 0.14 |
| 36 | 5.0 | 3.5 | 2.56 | 1.96 | 1.55 | 1.25 | 1.04 | 0.87 | 0.74 | 0.64 | 0.56 | 0.49 | 0.43 | 0.39 | 0.35 | 0.31 | 0.28 | 0.26 | 0.24 | 0.22 | 0.20 | 0.19 | 0.17 | 0.16 | 0.15 | 0.14 |
| 37 | 5.2 | 3.6 | 2.63 | 2.01 | 1.59 | 1.29 | 1.06 | 0.89 | 0.76 | 0.66 | 0.57 | 0.50 | 0.45 | 0.40 | 0.36 | 0.32 | 0.29 | 0.27 | 0.24 | 0.22 | 0.21 | 0.19 | 0.18 | 0.16 | 0.15 | 0.14 |
| 38 | 5.3 | 3.7 | 2.70 | 2.07 | 1.63 | 1.32 | 1.09 | 0.92 | 0.78 | 0.67 | 0.59 | 0.52 | 0.46 | 0.41 | 0.37 | 0.33 | 0.30 | 0.27 | 0.25 | 0.23 | 0.21 | 0.20 | 0.18 | 0.17 | 0.16 | 0.15 |
| 39 | 5.4 | 3.8 | 2.77 | 2.12 | 1.68 | 1.36 | 1.12 | 0.94 | 0.80 | 0.69 | 0.60 | 0.53 | 0.47 | 0.42 | 0.38 | 0.34 | 0.31 | 0.28 | 0.26 | 0.24 | 0.22 | 0.20 | 0.19 | 0.17 | 0.16 | 0.15 |
| 40 | 5.6 | 3.9 | 2.84 | 2.18 | 1.72 | 1.39 | 1.15 | 0.97 | 0.82 | 0.71 | 0.62 | 0.54 | 0.48 | 0.43 | 0.39 | 0.35 | 0.32 | 0.29 | 0.26 | 0.24 | 0.22 | 0.21 | 0.19 | 0.18 | 0.16 | 0.15 |
| 41 | 5.7 | 4.0 | 2.91 | 2.23 | 1.76 | 1.43 | 1.18 | 0.99 | 0.84 | 0.73 | 0.63 | 0.56 | 0.49 | 0.44 | 0.40 | 0.36 | 0.32 | 0.29 | 0.27 | 0.25 | 0.23 | 0.21 | 0.20 | 0.18 | 0.17 | 0.16 |
| 42 | 5.8 | 4.1 | 2.98 | 2.28 | 1.80 | 1.46 | 1.21 | 1.02 | 0.86 | 0.75 | 0.65 | 0.57 | 0.51 | 0.45 | 0.40 | 0.37 | 0.33 | 0.30 | 0.28 | 0.25 | 0.23 | 0.22 | 0.20 | 0.19 | 0.17 | 0.16 |
| 43 | 6.0 | 4.2 | 3.1 | 2.34 | 1.85 | 1.50 | 1.24 | 1.04 | 0.89 | 0.76 | 0.67 | 0.58 | 0.52 | 0.46 | 0.41 | 0.37 | 0.34 | 0.31 | 0.28 | 0.26 | 0.24 | 0.22 | 0.21 | 0.19 | 0.18 | 0.17 |
| 44 | 6.1 | 4.3 | 3.1 | 2.39 | 1.89 | 1.53 | 1.27 | 1.06 | 0.91 | 0.78 | 0.68 | 0.60 | 0.53 | 0.47 | 0.42 | 0.38 | 0.35 | 0.32 | 0.29 | 0.27 | 0.24 | 0.23 | 0.21 | 0.20 | 0.18 | 0.17 |
| 45 | 6.3 | 4.4 | 3.2 | 2.45 | 1.93 | 1.57 | 1.29 | 1.09 | 0.93 | 0.80 | 0.70 | 0.61 | 0.54 | 0.48 | 0.43 | 0.39 | 0.36 | 0.32 | 0.30 | 0.27 | 0.25 | 0.23 | 0.21 | 0.20 | 0.19 | 0.17 |
| 46 | 6.4 | 4.4 | 3.3 | 2.50 | 1.98 | 1.60 | 1.32 | 1.11 | 0.95 | 0.82 | 0.71 | 0.63 | 0.55 | 0.49 | 0.44 | 0.40 | 0.36 | 0.33 | 0.30 | 0.28 | 0.26 | 0.24 | 0.22 | 0.20 | 0.19 | 0.18 |
| 47 | 6.5 | 4.5 | 3.3 | 2.56 | 2.02 | 1.64 | 1.35 | 1.14 | 0.97 | 0.83 | 0.73 | 0.64 | 0.57 | 0.50 | 0.45 | 0.41 | 0.37 | 0.34 | 0.31 | 0.28 | 0.26 | 0.24 | 0.22 | 0.21 | 0.19 | 0.18 |
| 48 | 6.7 | 4.6 | 3.4 | 2.61 | 2.06 | 1.67 | 1.38 | 1.16 | 0.99 | 0.85 | 0.74 | 0.65 | 0.58 | 0.52 | 0.46 | 0.42 | 0.38 | 0.35 | 0.32 | 0.29 | 0.27 | 0.25 | 0.23 | 0.21 | 0.20 | 0.19 |
| 49 | 6.8 | 4.7 | 3.5 | 2.66 | 2.11 | 1.71 | 1.41 | 1.18 | 1.01 | 0.87 | 0.76 | 0.67 | 0.59 | 0.53 | 0.47 | 0.43 | 0.39 | 0.35 | 0.32 | 0.30 | 0.27 | 0.25 | 0.23 | 0.22 | 0.20 | 0.19 |
| 50 | 7.0 | 4.8 | 3.6 | 2.72 | 2.15 | 1.74 | 1.44 | 1.21 | 1.03 | 0.89 | 0.77 | 0.68 | 0.60 | 0.54 | 0.48 | 0.44 | 0.39 | 0.36 | 0.33 | 0.30 | 0.28 | 0.26 | 0.24 | 0.22 | 0.21 | 0.19 |
| 51 | 7.1 | 4.9 | 3.6 | 2.77 | 2.19 | 1.77 | 1.47 | 1.23 | 1.05 | 0.91 | 0.79 | 0.69 | 0.61 | 0.55 | 0.49 | 0.44 | 0.40 | 0.37 | 0.34 | 0.31 | 0.28 | 0.26 | 0.24 | 0.23 | 0.21 | 0.20 |
| 52 | 7.2 | 5.0 | 3.7 | 2.83 | 2.23 | 1.81 | 1.50 | 1.26 | 1.07 | 0.92 | 0.80 | 0.71 | 0.63 | 0.56 | 0.50 | 0.45 | 0.41 | 0.37 | 0.34 | 0.31 | 0.29 | 0.27 | 0.25 | 0.23 | 0.21 | 0.20 |
| 53 | 7.4 | 5.1 | 3.8 | 2.88 | 2.28 | 1.84 | 1.52 | 1.28 | 1.09 | 0.94 | 0.82 | 0.72 | 0.64 | 0.57 | 0.51 | 0.46 | 0.42 | 0.38 | 0.35 | 0.32 | 0.30 | 0.27 | 0.25 | 0.24 | 0.22 | 0.20 |
| 54 | 7.5 | 5.2 | 3.8 | 2.94 | 2.32 | 1.88 | 1.55 | 1.31 | 1.11 | 0.96 | 0.84 | 0.73 | 0.65 | 0.58 | 0.52 | 0.47 | 0.43 | 0.39 | 0.36 | 0.33 | 0.30 | 0.28 | 0.26 | 0.24 | 0.22 | 0.21 |
| 55 | 7.7 | 5.3 | 3.9 | 2.99 | 2.36 | 1.91 | 1.58 | 1.33 | 1.13 | 0.98 | 0.85 | 0.75 | 0.66 | 0.59 | 0.53 | 0.48 | 0.43 | 0.40 | 0.36 | 0.33 | 0.31 | 0.28 | 0.26 | 0.24 | 0.23 | 0.21 |
| 56 | 7.8 | 5.4 | 4.0 | 3.0 | 2.41 | 1.95 | 1.61 | 1.35 | 1.15 | 0.99 | 0.87 | 0.76 | 0.67 | 0.60 | 0.54 | 0.49 | 0.44 | 0.40 | 0.37 | 0.34 | 0.31 | 0.29 | 0.27 | 0.25 | 0.23 | 0.22 |
| 57 | 7.9 | 5.5 | 4.0 | 3.1 | 2.45 | 1.98 | 1.64 | 1.38 | 1.17 | 1.01 | 0.88 | 0.77 | 0.69 | 0.61 | 0.55 | 0.50 | 0.45 | 0.41 | 0.37 | 0.34 | 0.32 | 0.29 | 0.27 | 0.25 | 0.24 | 0.22 |
| 58 | 8.1 | 5.6 | 4.1 | 3.1 | 2.49 | 2.02 | 1.67 | 1.40 | 1.19 | 1.03 | 0.90 | 0.79 | 0.70 | 0.62 | 0.56 | 0.50 | 0.46 | 0.42 | 0.38 | 0.35 | 0.32 | 0.30 | 0.28 | 0.26 | 0.24 | 0.22 |
| 59 | 8.2 | 5.7 | 4.2 | 3.2 | 2.53 | 2.05 | 1.70 | 1.43 | 1.21 | 1.05 | 0.91 | 0.80 | 0.71 | 0.63 | 0.57 | 0.51 | 0.47 | 0.42 | 0.39 | 0.36 | 0.33 | 0.30 | 0.28 | 0.26 | 0.24 | 0.23 |
| 60 | 8.4 | 5.8 | 4.3 | 3.3 | 2.58 | 2.09 | 1.73 | 1.45 | 1.24 | 1.07 | 0.93 | 0.82 | 0.72 | 0.64 | 0.58 | 0.52 | 0.47 | 0.43 | 0.39 | 0.36 | 0.33 | 0.31 | 0.29 | 0.27 | 0.25 | 0.23 |

TABLE 5

| time [min] | average Martin Diameter [mm] | | | | | | | | | | | | | | | | | | | | | | | | | |
|---|---|---|---|---|---|---|---|---|---|---|---|---|---|---|---|---|---|---|---|---|---|---|---|---|---|---|
| | 0.5 | 0.6 | 0.7 | 0.8 | 0.9 | 1 | 1.1 | 1.2 | 1.3 | 1.4 | 1.5 | 1.6 | 1.7 | 1.8 | 1.9 | 2 | 2.1 | 2.2 | 2.3 | 2.4 | 2.5 | 2.6 | 2.7 | 2.8 | 2.9 | 3 |
| 1 | 0.19 | 0.13 | 0.10 | 0.08 | 0.06 | 0.05 | 0.04 | 0.03 | 0.03 | 0.02 | 0.02 | 0.02 | 0.02 | 0.01 | 0.01 | 0.01 | 0.01 | 0.01 | 0.01 | 0.01 | 0.01 | 0.01 | 0.01 | 0.01 | 0.01 | 0.01 |
| 2 | 0.38 | 0.27 | 0.20 | 0.15 | 0.12 | 0.10 | 0.08 | 0.07 | 0.06 | 0.05 | 0.04 | 0.04 | 0.03 | 0.03 | 0.03 | 0.02 | 0.02 | 0.02 | 0.02 | 0.02 | 0.02 | 0.01 | 0.01 | 0.01 | 0.01 | 0.01 |
| 3 | 0.58 | 0.40 | 0.29 | 0.23 | 0.18 | 0.14 | 0.12 | 0.10 | 0.09 | 0.07 | 0.06 | 0.06 | 0.05 | 0.04 | 0.04 | 0.04 | 0.03 | 0.03 | 0.03 | 0.03 | 0.02 | 0.02 | 0.02 | 0.02 | 0.02 | 0.02 |
| 4 | 0.77 | 0.53 | 0.39 | 0.30 | 0.24 | 0.19 | 0.16 | 0.13 | 0.11 | 0.10 | 0.09 | 0.08 | 0.07 | 0.06 | 0.05 | 0.05 | 0.04 | 0.04 | 0.04 | 0.03 | 0.03 | 0.03 | 0.03 | 0.02 | 0.02 | 0.02 |
| 5 | 0.96 | 0.67 | 0.49 | 0.38 | 0.30 | 0.24 | 0.20 | 0.17 | 0.14 | 0.12 | 0.11 | 0.09 | 0.08 | 0.07 | 0.07 | 0.06 | 0.05 | 0.05 | 0.05 | 0.04 | 0.04 | 0.04 | 0.03 | 0.03 | 0.03 | 0.03 |
| 6 | 1.15 | 0.80 | 0.59 | 0.45 | 0.36 | 0.29 | 0.24 | 0.20 | 0.17 | 0.15 | 0.13 | 0.11 | 0.10 | 0.09 | 0.08 | 0.07 | 0.07 | 0.06 | 0.05 | 0.05 | 0.05 | 0.04 | 0.04 | 0.04 | 0.03 | 0.03 |
| 7 | 1.34 | 0.93 | 0.69 | 0.53 | 0.41 | 0.34 | 0.28 | 0.23 | 0.20 | 0.17 | 0.15 | 0.13 | 0.12 | 0.10 | 0.09 | 0.08 | 0.08 | 0.07 | 0.06 | 0.06 | 0.05 | 0.05 | 0.04 | 0.04 | 0.04 | 0.04 |
| 8 | 1.54 | 1.07 | 0.78 | 0.60 | 0.47 | 0.38 | 0.32 | 0.27 | 0.23 | 0.20 | 0.17 | 0.15 | 0.13 | 0.12 | 0.11 | 0.09 | 0.09 | 0.08 | 0.07 | 0.07 | 0.06 | 0.06 | 0.05 | 0.05 | 0.05 | 0.04 |
| 9 | 1.73 | 1.20 | 0.88 | 0.68 | 0.53 | 0.43 | 0.36 | 0.30 | 0.26 | 0.22 | 0.19 | 0.17 | 0.15 | 0.13 | 0.12 | 0.11 | 0.10 | 0.09 | 0.08 | 0.08 | 0.07 | 0.06 | 0.06 | 0.06 | 0.05 | 0.05 |
| 10 | 1.92 | 1.33 | 0.98 | 0.75 | 0.59 | 0.48 | 0.40 | 0.33 | 0.28 | 0.24 | 0.21 | 0.19 | 0.17 | 0.15 | 0.13 | 0.12 | 0.11 | 0.10 | 0.09 | 0.08 | 0.08 | 0.07 | 0.07 | 0.06 | 0.06 | 0.05 |
| 11 | 2.11 | 1.47 | 1.08 | 0.83 | 0.65 | 0.53 | 0.44 | 0.37 | 0.31 | 0.27 | 0.23 | 0.21 | 0.18 | 0.16 | 0.15 | 0.13 | 0.12 | 0.11 | 0.10 | 0.09 | 0.08 | 0.08 | 0.07 | 0.07 | 0.06 | 0.06 |
| 12 | 2.30 | 1.60 | 1.18 | 0.90 | 0.71 | 0.58 | 0.48 | 0.40 | 0.34 | 0.29 | 0.26 | 0.23 | 0.20 | 0.18 | 0.16 | 0.14 | 0.13 | 0.12 | 0.11 | 0.10 | 0.09 | 0.09 | 0.08 | 0.07 | 0.07 | 0.06 |
| 13 | 2.50 | 1.73 | 1.27 | 0.98 | 0.77 | 0.62 | 0.52 | 0.43 | 0.37 | 0.32 | 0.28 | 0.24 | 0.22 | 0.19 | 0.17 | 0.16 | 0.14 | 0.13 | 0.12 | 0.11 | 0.10 | 0.09 | 0.09 | 0.08 | 0.07 | 0.07 |
| 14 | 2.69 | 1.87 | 1.37 | 1.05 | 0.83 | 0.67 | 0.56 | 0.47 | 0.40 | 0.34 | 0.30 | 0.26 | 0.23 | 0.21 | 0.19 | 0.17 | 0.15 | 0.14 | 0.13 | 0.12 | 0.11 | 0.10 | 0.09 | 0.09 | 0.08 | 0.07 |
| 15 | 2.88 | 2.00 | 1.47 | 1.13 | 0.89 | 0.72 | 0.60 | 0.50 | 0.43 | 0.37 | 0.32 | 0.28 | 0.25 | 0.22 | 0.20 | 0.18 | 0.16 | 0.15 | 0.14 | 0.12 | 0.11 | 0.11 | 0.10 | 0.09 | 0.08 | 0.08 |
| 16 | 3.1 | 2.13 | 1.57 | 1.20 | 0.95 | 0.77 | 0.63 | 0.53 | 0.45 | 0.39 | 0.34 | 0.30 | 0.27 | 0.24 | 0.21 | 0.19 | 0.17 | 0.16 | 0.15 | 0.13 | 0.12 | 0.11 | 0.11 | 0.10 | 0.09 | 0.09 |
| 17 | 3.3 | 2.27 | 1.67 | 1.28 | 1.01 | 0.82 | 0.67 | 0.57 | 0.48 | 0.42 | 0.36 | 0.32 | 0.28 | 0.25 | 0.23 | 0.20 | 0.19 | 0.17 | 0.15 | 0.14 | 0.13 | 0.12 | 0.11 | 0.10 | 0.10 | 0.09 |
| 18 | 3.5 | 2.40 | 1.76 | 1.35 | 1.07 | 0.86 | 0.71 | 0.60 | 0.51 | 0.44 | 0.38 | 0.34 | 0.30 | 0.27 | 0.24 | 0.22 | 0.20 | 0.18 | 0.16 | 0.15 | 0.14 | 0.13 | 0.12 | 0.11 | 0.10 | 0.10 |
| 19 | 3.6 | 2.53 | 1.86 | 1.43 | 1.13 | 0.91 | 0.75 | 0.63 | 0.54 | 0.47 | 0.41 | 0.36 | 0.32 | 0.28 | 0.25 | 0.23 | 0.21 | 0.19 | 0.17 | 0.16 | 0.15 | 0.13 | 0.13 | 0.12 | 0.11 | 0.10 |
| 20 | 3.8 | 2.67 | 1.96 | 1.50 | 1.19 | 0.96 | 0.79 | 0.67 | 0.57 | 0.49 | 0.43 | 0.38 | 0.33 | 0.30 | 0.27 | 0.24 | 0.22 | 0.20 | 0.18 | 0.17 | 0.15 | 0.14 | 0.13 | 0.12 | 0.11 | 0.11 |
| 21 | 4.0 | 2.80 | 2.06 | 1.58 | 1.24 | 1.01 | 0.83 | 0.70 | 0.60 | 0.51 | 0.45 | 0.39 | 0.35 | 0.31 | 0.28 | 0.25 | 0.23 | 0.21 | 0.19 | 0.18 | 0.16 | 0.15 | 0.14 | 0.13 | 0.12 | 0.11 |
| 22 | 4.2 | 2.93 | 2.16 | 1.65 | 1.30 | 1.06 | 0.87 | 0.73 | 0.62 | 0.54 | 0.47 | 0.41 | 0.37 | 0.33 | 0.29 | 0.26 | 0.24 | 0.22 | 0.20 | 0.18 | 0.17 | 0.16 | 0.14 | 0.13 | 0.13 | 0.12 |
| 23 | 4.4 | 3.1 | 2.25 | 1.73 | 1.36 | 1.10 | 0.91 | 0.77 | 0.65 | 0.56 | 0.49 | 0.43 | 0.38 | 0.34 | 0.31 | 0.28 | 0.25 | 0.23 | 0.21 | 0.19 | 0.18 | 0.16 | 0.15 | 0.14 | 0.13 | 0.12 |
| 24 | 4.6 | 3.2 | 2.35 | 1.80 | 1.42 | 1.15 | 0.95 | 0.80 | 0.68 | 0.59 | 0.51 | 0.45 | 0.40 | 0.36 | 0.32 | 0.29 | 0.26 | 0.24 | 0.22 | 0.20 | 0.18 | 0.17 | 0.16 | 0.15 | 0.14 | 0.13 |
| 25 | 4.8 | 3.3 | 2.45 | 1.88 | 1.48 | 1.20 | 0.99 | 0.83 | 0.71 | 0.61 | 0.53 | 0.47 | 0.42 | 0.37 | 0.33 | 0.30 | 0.27 | 0.25 | 0.23 | 0.21 | 0.19 | 0.18 | 0.16 | 0.15 | 0.14 | 0.13 |
| 26 | 5.0 | 3.5 | 2.55 | 1.95 | 1.54 | 1.25 | 1.03 | 0.87 | 0.74 | 0.64 | 0.55 | 0.49 | 0.43 | 0.39 | 0.35 | 0.31 | 0.28 | 0.26 | 0.24 | 0.22 | 0.20 | 0.18 | 0.17 | 0.16 | 0.15 | 0.14 |
| 27 | 5.2 | 3.6 | 2.64 | 2.03 | 1.60 | 1.30 | 1.07 | 0.90 | 0.77 | 0.66 | 0.58 | 0.51 | 0.45 | 0.40 | 0.36 | 0.32 | 0.29 | 0.27 | 0.24 | 0.23 | 0.21 | 0.19 | 0.18 | 0.17 | 0.15 | 0.14 |
| 28 | 5.4 | 3.7 | 2.74 | 2.10 | 1.66 | 1.34 | 1.11 | 0.93 | 0.80 | 0.69 | 0.60 | 0.53 | 0.47 | 0.41 | 0.37 | 0.34 | 0.30 | 0.28 | 0.25 | 0.23 | 0.22 | 0.20 | 0.18 | 0.17 | 0.16 | 0.15 |
| 29 | 5.6 | 3.9 | 2.84 | 2.18 | 1.72 | 1.39 | 1.15 | 0.97 | 0.82 | 0.71 | 0.62 | 0.54 | 0.48 | 0.43 | 0.39 | 0.35 | 0.32 | 0.29 | 0.26 | 0.24 | 0.22 | 0.21 | 0.19 | 0.18 | 0.17 | 0.15 |
| 30 | 5.8 | 4.0 | 2.94 | 2.25 | 1.78 | 1.44 | 1.19 | 1.00 | 0.85 | 0.73 | 0.64 | 0.56 | 0.50 | 0.44 | 0.40 | 0.36 | 0.33 | 0.30 | 0.27 | 0.25 | 0.23 | 0.21 | 0.20 | 0.18 | 0.17 | 0.16 |
| 31 | 6.0 | 4.1 | 3.0 | 2.33 | 1.84 | 1.49 | 1.23 | 1.03 | 0.88 | 0.76 | 0.66 | 0.58 | 0.51 | 0.46 | 0.41 | 0.37 | 0.34 | 0.31 | 0.28 | 0.26 | 0.24 | 0.22 | 0.20 | 0.19 | 0.18 | 0.17 |
| 32 | 6.1 | 4.3 | 3.1 | 2.40 | 1.90 | 1.54 | 1.27 | 1.07 | 0.91 | 0.78 | 0.68 | 0.60 | 0.53 | 0.47 | 0.43 | 0.38 | 0.35 | 0.32 | 0.29 | 0.27 | 0.25 | 0.23 | 0.21 | 0.20 | 0.18 | 0.17 |

TABLE 5-continued

| time [min] | average Martin Diameter [mm] | | | | | | | | | | | | | | | | | | | | | | | | | |
|---|---|---|---|---|---|---|---|---|---|---|---|---|---|---|---|---|---|---|---|---|---|---|---|---|---|---|
| | 0.5 | 0.6 | 0.7 | 0.8 | 0.9 | 1 | 1.1 | 1.2 | 1.3 | 1.4 | 1.5 | 1.6 | 1.7 | 1.8 | 1.9 | 2 | 2.1 | 2.2 | 2.3 | 2.4 | 2.5 | 2.6 | 2.7 | 2.8 | 2.9 | 3 |
| 33 | 6.3 | 4.4 | 3.2 | 2.48 | 1.96 | 1.58 | 1.31 | 1.10 | 0.94 | 0.81 | 0.70 | 0.62 | 0.55 | 0.49 | 0.44 | 0.40 | 0.36 | 0.33 | 0.30 | 0.28 | 0.25 | 0.23 | 0.22 | 0.20 | 0.19 | 0.18 |
| 34 | 6.5 | 4.5 | 3.3 | 2.55 | 2.01 | 1.63 | 1.35 | 1.13 | 0.97 | 0.83 | 0.73 | 0.64 | 0.56 | 0.50 | 0.45 | 0.41 | 0.37 | 0.34 | 0.31 | 0.28 | 0.26 | 0.24 | 0.22 | 0.21 | 0.19 | 0.18 |
| 35 | 6.7 | 4.7 | 3.4 | 2.63 | 2.07 | 1.68 | 1.39 | 1.17 | 0.99 | 0.86 | 0.75 | 0.66 | 0.58 | 0.52 | 0.47 | 0.42 | 0.38 | 0.35 | 0.32 | 0.29 | 0.27 | 0.25 | 0.23 | 0.21 | 0.20 | 0.19 |
| 36 | 6.9 | 4.8 | 3.5 | 2.70 | 2.13 | 1.73 | 1.43 | 1.20 | 1.02 | 0.88 | 0.77 | 0.68 | 0.60 | 0.53 | 0.48 | 0.43 | 0.39 | 0.36 | 0.33 | 0.30 | 0.28 | 0.26 | 0.24 | 0.22 | 0.21 | 0.19 |
| 37 | 7.1 | 4.9 | 3.6 | 2.78 | 2.19 | 1.78 | 1.47 | 1.23 | 1.05 | 0.91 | 0.79 | 0.69 | 0.61 | 0.55 | 0.49 | 0.44 | 0.40 | 0.37 | 0.34 | 0.31 | 0.28 | 0.26 | 0.24 | 0.23 | 0.21 | 0.20 |
| 38 | 7.3 | 5.1 | 3.7 | 2.85 | 2.25 | 1.82 | 1.51 | 1.27 | 1.08 | 0.93 | 0.81 | 0.71 | 0.63 | 0.56 | 0.51 | 0.46 | 0.41 | 0.38 | 0.35 | 0.32 | 0.29 | 0.27 | 0.25 | 0.23 | 0.22 | 0.20 |
| 39 | 7.5 | 5.2 | 3.8 | 2.93 | 2.31 | 1.87 | 1.55 | 1.30 | 1.11 | 0.96 | 0.83 | 0.73 | 0.65 | 0.58 | 0.52 | 0.47 | 0.42 | 0.39 | 0.35 | 0.33 | 0.30 | 0.28 | 0.26 | 0.24 | 0.22 | 0.21 |
| 40 | 7.7 | 5.3 | 3.9 | 3.0 | 2.37 | 1.92 | 1.59 | 1.33 | 1.14 | 0.98 | 0.85 | 0.75 | 0.66 | 0.59 | 0.53 | 0.48 | 0.44 | 0.40 | 0.36 | 0.33 | 0.31 | 0.28 | 0.26 | 0.24 | 0.22 | 0.21 |
| 41 | 7.9 | 5.5 | 4.0 | 3.1 | 2.43 | 1.97 | 1.63 | 1.37 | 1.16 | 1.00 | 0.87 | 0.77 | 0.68 | 0.61 | 0.55 | 0.49 | 0.45 | 0.41 | 0.37 | 0.34 | 0.32 | 0.29 | 0.27 | 0.25 | 0.23 | 0.22 |
| 42 | 8.1 | 5.6 | 4.1 | 3.2 | 2.49 | 2.02 | 1.67 | 1.40 | 1.19 | 1.03 | 0.90 | 0.79 | 0.70 | 0.62 | 0.56 | 0.50 | 0.46 | 0.42 | 0.38 | 0.35 | 0.32 | 0.30 | 0.28 | 0.26 | 0.24 | 0.22 |
| 43 | 8.3 | 5.7 | 4.2 | 3.2 | 2.55 | 2.06 | 1.71 | 1.43 | 1.22 | 1.05 | 0.92 | 0.81 | 0.71 | 0.64 | 0.57 | 0.52 | 0.47 | 0.43 | 0.39 | 0.36 | 0.33 | 0.31 | 0.29 | 0.26 | 0.25 | 0.23 |
| 44 | 8.4 | 5.9 | 4.3 | 3.3 | 2.61 | 2.11 | 1.75 | 1.47 | 1.25 | 1.08 | 0.94 | 0.83 | 0.73 | 0.65 | 0.59 | 0.53 | 0.48 | 0.44 | 0.40 | 0.37 | 0.34 | 0.31 | 0.29 | 0.27 | 0.25 | 0.23 |
| 45 | 8.6 | 6.0 | 4.4 | 3.4 | 2.67 | 2.16 | 1.79 | 1.50 | 1.28 | 1.10 | 0.96 | 0.84 | 0.75 | 0.67 | 0.60 | 0.54 | 0.49 | 0.45 | 0.41 | 0.38 | 0.35 | 0.32 | 0.30 | 0.28 | 0.26 | 0.24 |
| 46 | 8.8 | 6.1 | 4.5 | 3.5 | 2.73 | 2.21 | 1.82 | 1.53 | 1.31 | 1.13 | 0.98 | 0.86 | 0.76 | 0.68 | 0.61 | 0.55 | 0.50 | 0.46 | 0.42 | 0.38 | 0.35 | 0.33 | 0.30 | 0.28 | 0.26 | 0.25 |
| 47 | 9.0 | 6.3 | 4.6 | 3.5 | 2.79 | 2.26 | 1.86 | 1.57 | 1.33 | 1.15 | 1.00 | 0.88 | 0.78 | 0.70 | 0.62 | 0.56 | 0.51 | 0.47 | 0.43 | 0.39 | 0.36 | 0.33 | 0.31 | 0.29 | 0.27 | 0.25 |
| 48 | 9.2 | 6.4 | 4.7 | 3.6 | 2.84 | 2.30 | 1.90 | 1.60 | 1.36 | 1.18 | 1.02 | 0.90 | 0.80 | 0.71 | 0.64 | 0.58 | 0.52 | 0.48 | 0.44 | 0.40 | 0.37 | 0.34 | 0.32 | 0.29 | 0.27 | 0.26 |
| 49 | 9.4 | 6.5 | 4.8 | 3.7 | 2.90 | 2.35 | 1.94 | 1.63 | 1.39 | 1.20 | 1.05 | 0.92 | 0.81 | 0.73 | 0.65 | 0.59 | 0.53 | 0.49 | 0.44 | 0.41 | 0.38 | 0.35 | 0.32 | 0.30 | 0.28 | 0.26 |
| 50 | 9.6 | 6.7 | 4.9 | 3.8 | 2.96 | 2.40 | 1.98 | 1.67 | 1.42 | 1.22 | 1.07 | 0.94 | 0.83 | 0.74 | 0.66 | 0.60 | 0.54 | 0.50 | 0.45 | 0.42 | 0.38 | 0.36 | 0.33 | 0.31 | 0.29 | 0.27 |
| 51 | 9.8 | 6.8 | 5.0 | 3.8 | 3.0 | 2.45 | 2.02 | 1.70 | 1.45 | 1.25 | 1.09 | 0.96 | 0.85 | 0.76 | 0.68 | 0.61 | 0.56 | 0.51 | 0.46 | 0.43 | 0.39 | 0.36 | 0.34 | 0.31 | 0.29 | 0.27 |
| 52 | 10.0 | 6.9 | 5.1 | 3.9 | 3.1 | 2.50 | 2.06 | 1.73 | 1.48 | 1.27 | 1.11 | 0.98 | 0.86 | 0.77 | 0.69 | 0.62 | 0.57 | 0.52 | 0.47 | 0.43 | 0.40 | 0.37 | 0.34 | 0.32 | 0.30 | 0.28 |
| 53 | 10.2 | 7.1 | 5.2 | 4.0 | 3.1 | 2.54 | 2.10 | 1.77 | 1.51 | 1.30 | 1.13 | 0.99 | 0.88 | 0.79 | 0.70 | 0.64 | 0.58 | 0.53 | 0.48 | 0.44 | 0.41 | 0.38 | 0.35 | 0.32 | 0.30 | 0.28 |
| 54 | 10.4 | 7.2 | 5.3 | 4.1 | 3.2 | 2.59 | 2.14 | 1.80 | 1.53 | 1.32 | 1.15 | 1.01 | 0.90 | 0.80 | 0.72 | 0.65 | 0.59 | 0.54 | 0.49 | 0.45 | 0.41 | 0.38 | 0.36 | 0.33 | 0.31 | 0.29 |
| 55 | 10.6 | 7.3 | 5.4 | 4.1 | 3.3 | 2.64 | 2.18 | 1.83 | 1.56 | 1.35 | 1.17 | 1.03 | 0.91 | 0.81 | 0.73 | 0.66 | 0.60 | 0.55 | 0.50 | 0.46 | 0.42 | 0.39 | 0.36 | 0.34 | 0.31 | 0.29 |
| 56 | 10.8 | 7.5 | 5.5 | 4.2 | 3.3 | 2.69 | 2.22 | 1.87 | 1.59 | 1.37 | 1.19 | 1.05 | 0.93 | 0.83 | 0.74 | 0.67 | 0.61 | 0.56 | 0.51 | 0.47 | 0.43 | 0.40 | 0.37 | 0.34 | 0.32 | 0.30 |
| 57 | 10.9 | 7.6 | 5.6 | 4.3 | 3.4 | 2.74 | 2.26 | 1.90 | 1.62 | 1.40 | 1.22 | 1.07 | 0.95 | 0.84 | 0.76 | 0.68 | 0.62 | 0.57 | 0.52 | 0.48 | 0.44 | 0.40 | 0.38 | 0.35 | 0.32 | 0.30 |
| 58 | 11.1 | 7.7 | 5.7 | 4.4 | 3.4 | 2.78 | 2.30 | 1.93 | 1.65 | 1.42 | 1.24 | 1.09 | 0.96 | 0.86 | 0.77 | 0.70 | 0.63 | 0.58 | 0.53 | 0.48 | 0.45 | 0.41 | 0.38 | 0.36 | 0.33 | 0.31 |
| 59 | 11.3 | 7.9 | 5.8 | 4.4 | 3.5 | 2.83 | 2.34 | 1.97 | 1.68 | 1.44 | 1.26 | 1.11 | 0.98 | 0.87 | 0.78 | 0.71 | 0.64 | 0.59 | 0.54 | 0.49 | 0.45 | 0.42 | 0.39 | 0.36 | 0.34 | 0.31 |
| 60 | 11.5 | 8.0 | 5.9 | 4.5 | 3.6 | 2.88 | 2.38 | 2.00 | 1.70 | 1.47 | 1.28 | 1.13 | 1.00 | 0.89 | 0.80 | 0.72 | 0.65 | 0.60 | 0.54 | 0.50 | 0.46 | 0.43 | 0.40 | 0.37 | 0.34 | 0.32 |

The invention claimed is:

1. A method for preparing a coffee concentrate comprising the steps of:
   (a) providing ground roasted coffee beans having an average Martin diameter minimal value of from 0.5 to 3 mm;
   (b) subjecting the ground roasted coffee beans to primary extraction with water, said primary extraction comprising obtaining a first primary extract with a draw-off factor of at most 2;
   (c) drawing off a second primary extract after said first primary extract;
   (d) subjecting the primarily extracted ground roasted coffee beans to a secondary extraction with water, so as to obtain a secondary extract;
   (e) subjecting the second primary extract and the secondary extract to evaporation and combining the extracts before or after the evaporation, so as to obtain a concentrated extract having a dry solid matter content of from 30 wt. % to 75 wt. %;
   (f) combining the concentrated extract with the first primary extract; and
   (g) optionally adding water;
   so as to obtain a liquid coffee concentrate having a dry solid matter content of from 15 wt. % to 55 wt. %, wherein the primary extraction is conducted under such conditions as to satisfy a mass transfer Fourier number of at least 0.35; and wherein the ratio of the first primary drawn soluble solids yield (Y-PE1) to the total extraction yield for coffee solubles (Y_TE) is in a range of from 0.15 to 1.0.

2. The method according to claim 1, wherein the Martin diameter minimal value of the ground roasted coffee beans is 0.5 to 2.0 mm.

3. The method according to claim 2, wherein the average Martin diameter minimal value of the ground roasted coffee beans is 1.4 to 1.9 mm.

4. The method according to claim 1, wherein the coffee beans have a roasting degree corresponding to a roasting loss of 13% to 20%.

5. The method according to claim 1, wherein the ground roasted coffee beans of step (a) have been roasted for 7.5 minutes to 15 minutes.

6. The method according to claim 1, wherein the total extraction yield (Y_TE) ranges from 25% to 45%.

7. The method according to claim 1, wherein the first primary drawn soluble solids yield (Y-PE1) ranges from 7.5% to 25%.

8. The method according to claim 1, wherein the ratio of first primary drawn soluble solids yield (Y_PE1) to total extraction yield (Y_TE) ranges from 0.20 to 0.60.

9. The method according to claim 1, wherein the Fourier number for primary extraction ranges from 0.5 to 1.5.

10. The method according to claim 1, wherein aroma is recovered by means of steam stripping from the second primary draw-off to obtain a recovered aroma distillate, wherein partial aroma-recovery is applied to 20% to 60% of the total amount of the second primary draw-off, and the recovered aroma distillate is added to the coffee concentrate after evaporation.

11. The method according to claim 1, wherein the dry solid matter content of the concentrated extract of step (e) after evaporation ranges from 40% solids content to 60% solids content.

12. The method according to claim 1, wherein the ratio of water-to-coffee bean weight of step (b) is between 2.8 and 15.

13. The method according to claim 1, wherein the primary extraction is conducted using, as an extraction fluid, water of a temperature between 70° C. and 120° C.

14. The method according to claim 1, wherein the dry solid matter content of the obtained liquid coffee concentrate ranges from 25 wt. % to 35 wt. %.

15. A coffee concentrate comprising 15% to 55% dry solid matter, obtainable by a method as claimed in claim 1.

16. A coffee concentrate comprising 15% to 55% dry solid matter, characterized by comprising 1-caffeoylquinic acid lactone (1-CQL) in an amount of at least 450 mg chlorogenic acid equivalents per kg of dry solid matter.

17. The method according to claim 2, wherein the average Martin diameter minimal value of the ground roasted coffee beans is 1.6 to 1.8 mm.

18. The method according to claim 1, wherein the ground roasted coffee beans of step (a) have been roasted for 8 to 10 minutes.

19. The method according to claim 1, wherein the total extraction yield (Y_TE) ranges from 30% to 35%.

20. The method according to claim 1, wherein the first primary drawn soluble solids yield (Y_PE1) ranges from 10% to 20%.

21. The method according to claim 1, wherein the ratio of Y_PE1 to Y_TE ranges from 0.30 to 0.40.

22. The method according to claim 1, wherein the Fourier number for primary extraction ranges from 0.5 to 1.0.

23. The method according to claim 1, wherein aroma is recovered by means of steam stripping from the second primary draw-off to obtain a recovered aroma distillate, wherein partial aroma-recovery is applied to 20% to 40% of the total amount of the second primary draw-off, and the recovered aroma distillate is added to the coffee concentrate after evaporation.

24. The method according to claim 1, wherein the ratio of water-to-coffee bean weight of step (b) is between 3 and 10.

25. The method according to claim 1, wherein the ratio of water-to-coffee bean weight of step (b) is between 4.0 and 8.0.

26. The method according to claim 1, wherein the primary extraction is conducted using, as an extraction fluid, water of a temperature between 85° C. and 95° C.

27. The coffee concentrate of claim 16, comprising 1-CQL in an amount of at least 510 mg chlorogenic acid equivalents per kg of dry solid matter.

28. The coffee concentrate of claim 16, comprising 1-CQL in an amount of at least 590 mg chlorogenic acid equivalents per kg of dry solid matter.

* * * * *